(12) United States Patent
Reed

(10) Patent No.: US 9,781,797 B2
(45) Date of Patent: *Oct. 3, 2017

(54) HIGH EFFICIENCY POWER CONTROLLER FOR LUMINAIRE

(71) Applicant: Express Imaging Systems, LLC, Renton, WA (US)

(72) Inventor: William G. Reed, Seattle, WA (US)

(73) Assignee: Express Imaging Systems, LLC, Renton, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/206,019

(22) Filed: Jul. 8, 2016

(65) Prior Publication Data

US 2016/0323955 A1    Nov. 3, 2016

Related U.S. Application Data

(63) Continuation of application No. 14/546,354, filed on Nov. 18, 2014, now Pat. No. 9,414,449.

(Continued)

(51) Int. Cl.
*H05B 33/08* (2006.01)
*H01F 27/24* (2006.01)
(Continued)

(52) U.S. Cl.
CPC ......... *H05B 33/0851* (2013.01); *H01F 27/24* (2013.01); *H02M 1/4208* (2013.01);
(Continued)

(58) Field of Classification Search
CPC ......... H01F 1/00; H05B 41/18; H05B 41/282; H05B 33/0815
(Continued)

(56) References Cited

U.S. PATENT DOCUMENTS 2,240,050 A    4/1941  Nuebling
2,745,055 A    5/1956  Woerdemann
(Continued)

FOREIGN PATENT DOCUMENTS

CN    103162187 A    6/2013
DE    40 01 980 A1    8/1990
(Continued)

OTHER PUBLICATIONS

Extended European Search Report, dated Apr. 11, 2016, for corresponding European Application No. 16152644.7, 8 pages.
(Continued)

*Primary Examiner* — Douglas W Owens
*Assistant Examiner* — Syed M Kaiser
(74) *Attorney, Agent, or Firm* — Seed IP Law Group LLP

(57) ABSTRACT

Systems, methods and articles for providing lighting or illumination systems having drive circuits that employ a magnetic amplifier ("mag-amp") and one or more feedback circuits to form a power converter that powers solid-state light sources (e.g., LEDs). The magnetic amplifier includes one or more magnetic cores which provides a controllable reluctance for magnetic flux. The magnetic amplifier includes one or more power windings which receive energy from an alternating current (AC) supply (e.g., AC mains) and delivers rectified AC current as direct current (DC) to one or more solid-state light sources. The magnetic amplifier includes one or more control windings coupled to a DC control source. The drive circuit may have two or more rectifiers (e.g., solid-state rectifiers) to provide a direct current to drive the solid-state light sources and also to isolate the one or more control windings from interference from the magnetic flux of the one or more power windings.

19 Claims, 4 Drawing Sheets

Related U.S. Application Data

(60) Provisional application No. 61/905,699, filed on Nov. 18, 2013.

(51) Int. Cl.
  *H02M 1/42* (2007.01)
  *H02M 7/06* (2006.01)

(52) U.S. Cl.
  CPC .......... *H02M 7/06* (2013.01); *H05B 33/0809* (2013.01); *H05B 33/0827* (2013.01); *H05B 33/0884* (2013.01)

(58) Field of Classification Search
  USPC ....... 315/224, 307, 294; 336/221; 363/21.12
  See application file for complete search history.

(56) References Cited

U.S. PATENT DOCUMENTS

| | | | |
|---|---|---|---|
| 3,374,396 A * | 3/1968 | Bell | H05B 41/18 315/171 |
| 4,153,927 A | 5/1979 | Owens | |
| 4,237,377 A | 12/1980 | Sansum | |
| 4,663,521 A | 5/1987 | Maile | |
| 5,086,379 A | 2/1992 | Denison et al. | |
| 5,160,202 A | 11/1992 | Légaré | |
| 5,161,107 A | 11/1992 | Mayeaux et al. | |
| 5,230,556 A | 7/1993 | Canty et al. | |
| 5,276,385 A | 1/1994 | Itoh et al. | |
| 5,343,121 A | 8/1994 | Terman et al. | |
| 5,349,505 A | 9/1994 | Poppenheimer | |
| 5,450,302 A | 9/1995 | Maase et al. | |
| 5,561,351 A | 10/1996 | Vrionis et al. | |
| 5,589,741 A | 12/1996 | Terman et al. | |
| 5,808,294 A | 9/1998 | Neumann | |
| 5,869,960 A | 2/1999 | Brand | |
| 5,892,331 A | 4/1999 | Hollaway | |
| 5,892,335 A | 4/1999 | Archer | |
| 5,936,362 A | 8/1999 | Alt et al. | |
| 6,111,739 A | 8/2000 | Wu et al. | |
| 6,149,283 A | 11/2000 | Conway et al. | |
| 6,154,015 A | 11/2000 | Ichiba | |
| 6,377,191 B1 | 4/2002 | Takubo | |
| 6,612,720 B1 | 9/2003 | Beadle | |
| 6,674,060 B2 | 1/2004 | Antila | |
| 6,681,195 B1 | 1/2004 | Poland et al. | |
| 6,746,274 B1 | 6/2004 | Verfuerth | |
| 6,753,842 B1 | 6/2004 | Williams et al. | |
| 6,828,911 B2 | 12/2004 | Jones et al. | |
| 6,841,947 B2 | 1/2005 | Berg-johansen | |
| 6,880,956 B2 | 4/2005 | Zhang | |
| 6,902,292 B2 | 6/2005 | Lai | |
| 6,985,827 B2 | 1/2006 | Williams et al. | |
| 7,019,276 B2 | 3/2006 | Cloutier et al. | |
| 7,066,622 B2 | 6/2006 | Alessio | |
| 7,081,722 B1 | 7/2006 | Huynh et al. | |
| 7,122,976 B1 | 10/2006 | Null et al. | |
| 7,188,967 B2 | 3/2007 | Dalton et al. | |
| 7,190,121 B2 | 3/2007 | Rose et al. | |
| 7,196,477 B2 | 3/2007 | Richmond | |
| 7,252,385 B2 | 8/2007 | Engle et al. | |
| 7,258,464 B2 | 8/2007 | Morris et al. | |
| 7,270,441 B2 | 9/2007 | Fiene | |
| 7,281,820 B2 | 10/2007 | Bayat et al. | |
| 7,294,973 B2 * | 11/2007 | Takahama | H05B 41/282 315/209 R |
| 7,314,291 B2 | 1/2008 | Tain et al. | |
| 7,317,403 B2 | 1/2008 | Grootes et al. | |
| 7,322,714 B2 | 1/2008 | Barnett et al. | |
| 7,330,568 B2 | 2/2008 | Nagaoka et al. | |
| 7,339,323 B2 | 3/2008 | Bucur | |
| 7,339,471 B1 | 3/2008 | Chan et al. | |
| 7,405,524 B2 | 7/2008 | Null et al. | |
| 7,438,440 B2 | 10/2008 | Dorogi | |
| 7,440,280 B2 | 10/2008 | Shuy | |
| 7,468,723 B1 | 12/2008 | Collins | |
| 7,524,089 B2 | 4/2009 | Park | |
| 7,538,499 B2 | 5/2009 | Ashdown | |
| 7,547,113 B2 | 6/2009 | Lee | |
| 7,559,674 B2 | 7/2009 | He et al. | |
| 7,564,198 B2 | 7/2009 | Yamamoto et al. | |
| 7,569,802 B1 | 8/2009 | Mullins | |
| 7,578,596 B2 | 8/2009 | Martin | |
| 7,578,597 B2 | 8/2009 | Hoover et al. | |
| 7,623,042 B2 | 11/2009 | Huizenga | |
| 7,627,372 B2 | 12/2009 | Vaisnys et al. | |
| 7,631,324 B2 | 12/2009 | Buonasera et al. | |
| 7,633,463 B2 | 12/2009 | Negru | |
| 7,638,743 B2 | 12/2009 | Bartol et al. | |
| 7,665,862 B2 | 2/2010 | Villard | |
| 7,677,753 B1 | 3/2010 | Wills | |
| 7,688,002 B2 | 3/2010 | Ashdown et al. | |
| 7,688,222 B2 | 3/2010 | Peddie et al. | |
| 7,697,925 B1 | 4/2010 | Wilson et al. | |
| 7,702,135 B2 | 4/2010 | Hill et al. | |
| 7,703,951 B2 | 4/2010 | Piepgras et al. | |
| 7,746,003 B2 | 6/2010 | Verfuerth et al. | |
| D621,410 S | 8/2010 | Verfuerth et al. | |
| D621,411 S | 8/2010 | Verfuerth et al. | |
| 7,798,669 B2 | 9/2010 | Trojanowski et al. | |
| 7,804,200 B2 | 9/2010 | Flaherty | |
| 7,834,922 B2 | 11/2010 | Kurane | |
| 7,872,423 B2 | 1/2011 | Biery et al. | |
| 7,932,535 B2 | 4/2011 | Mahalingam et al. | |
| 7,940,191 B2 | 5/2011 | Hierzer | |
| 7,952,609 B2 | 5/2011 | Simerly et al. | |
| 7,960,919 B2 | 6/2011 | Furukawa | |
| 7,983,817 B2 | 7/2011 | Breed | |
| 7,985,005 B2 | 7/2011 | Alexander et al. | |
| 8,100,552 B2 | 1/2012 | Spero | |
| 8,118,456 B2 | 2/2012 | Reed et al. | |
| 8,143,769 B2 | 3/2012 | Li | |
| 8,174,212 B2 | 5/2012 | Tziony et al. | |
| 8,183,797 B2 | 5/2012 | McKinney | |
| 8,207,830 B2 | 6/2012 | Rutjes et al. | |
| 8,260,575 B2 | 9/2012 | Walters et al. | |
| 8,290,710 B2 | 10/2012 | Cleland et al. | |
| 8,324,840 B2 | 12/2012 | Shteynberg et al. | |
| 8,334,640 B2 | 12/2012 | Reed et al. | |
| 8,344,665 B2 | 1/2013 | Verfuerth et al. | |
| 8,376,583 B2 | 2/2013 | Wang et al. | |
| 8,378,563 B2 | 2/2013 | Reed et al. | |
| 8,395,329 B2 | 3/2013 | Jutras et al. | |
| 8,445,826 B2 | 5/2013 | Verfuerth | |
| 8,450,670 B2 | 5/2013 | Verfuerth et al. | |
| 8,457,793 B2 | 6/2013 | Golding et al. | |
| 8,476,565 B2 | 7/2013 | Verfuerth | |
| 8,508,137 B2 | 8/2013 | Reed | |
| 8,541,950 B2 | 9/2013 | Reed | |
| 8,586,902 B2 | 11/2013 | Verfuerth | |
| 8,604,701 B2 | 12/2013 | Verfuerth et al. | |
| 8,610,358 B2 | 12/2013 | Reed | |
| 8,629,621 B2 | 1/2014 | Reed | |
| 8,749,635 B2 | 6/2014 | Högasten et al. | |
| 8,764,237 B2 | 7/2014 | Wang et al. | |
| 8,779,340 B2 | 7/2014 | Verfuerth et al. | |
| 8,779,686 B2 | 7/2014 | Jin | |
| 8,810,138 B2 | 8/2014 | Reed | |
| 8,872,964 B2 | 10/2014 | Reed et al. | |
| 8,878,440 B2 | 11/2014 | Reed | |
| 8,884,203 B2 | 11/2014 | Verfuerth et al. | |
| 8,896,215 B2 | 11/2014 | Reed et al. | |
| 8,901,825 B2 | 12/2014 | Reed | |
| 8,921,751 B2 | 12/2014 | Verfuerth | |
| 8,922,124 B2 | 12/2014 | Reed et al. | |
| 8,926,138 B2 | 1/2015 | Reed et al. | |
| 8,926,139 B2 | 1/2015 | Reed et al. | |
| 8,975,827 B2 | 3/2015 | Chobot et al. | |
| 8,987,992 B2 | 3/2015 | Reed | |
| 9,002,522 B2 | 4/2015 | Mohan et al. | |
| 9,084,310 B2 | 7/2015 | Bedell et al. | |
| 9,119,270 B2 | 8/2015 | Chen et al. | |
| 9,210,751 B2 | 12/2015 | Reed | |
| 9,210,759 B2 | 12/2015 | Reed | |

(56) References Cited

U.S. PATENT DOCUMENTS

| | | |
|---|---|---|
| 9,414,449 B2 * | 8/2016 | Reed .............. H05B 33/0809 |
| 2002/0084767 A1 | 7/2002 | Arai |
| 2003/0016143 A1 | 1/2003 | Ghazarian |
| 2003/0184672 A1 | 10/2003 | Wu et al. |
| 2004/0192227 A1 | 9/2004 | Beach et al. |
| 2005/0117344 A1 | 6/2005 | Bucher et al. |
| 2005/0174762 A1 | 8/2005 | Fogerlie |
| 2005/0179404 A1 | 8/2005 | Veskovic et al. |
| 2005/0231133 A1 | 10/2005 | Lys |
| 2006/0014118 A1 | 1/2006 | Utama |
| 2006/0066264 A1 | 3/2006 | Ishigaki et al. |
| 2006/0098440 A1 | 5/2006 | Allen |
| 2006/0146652 A1 | 7/2006 | Huizi et al. |
| 2006/0208667 A1 | 9/2006 | Lys et al. |
| 2007/0032990 A1 | 2/2007 | Williams et al. |
| 2007/0102033 A1 | 5/2007 | Petrocy |
| 2007/0164689 A1 | 7/2007 | Suzuki |
| 2007/0224461 A1 | 9/2007 | Oh |
| 2007/0225933 A1 | 9/2007 | Shimomura |
| 2008/0018261 A1 | 1/2008 | Kastner |
| 2008/0025020 A1 | 1/2008 | Kolb |
| 2008/0043106 A1 | 2/2008 | Hassapis et al. |
| 2008/0062687 A1 | 3/2008 | Behar et al. |
| 2008/0130304 A1 | 6/2008 | Rash et al. |
| 2008/0215279 A1 | 9/2008 | Salsbury et al. |
| 2008/0224623 A1 | 9/2008 | Yu |
| 2008/0232116 A1 | 9/2008 | Kim |
| 2008/0248837 A1 | 10/2008 | Kunkel |
| 2008/0266839 A1 | 10/2008 | Claypool et al. |
| 2009/0046151 A1 | 2/2009 | Nagaoka et al. |
| 2009/0058320 A1 | 3/2009 | Chou et al. |
| 2009/0129067 A1 | 5/2009 | Fan et al. |
| 2009/0153062 A1 | 6/2009 | Guo et al. |
| 2009/0160358 A1 | 6/2009 | Leiderman |
| 2009/0161356 A1 | 6/2009 | Negley et al. |
| 2009/0167203 A1 | 7/2009 | Dahlman et al. |
| 2009/0195179 A1 | 8/2009 | Joseph et al. |
| 2009/0230883 A1 | 9/2009 | Haug |
| 2009/0235208 A1 | 9/2009 | Nakayama et al. |
| 2009/0261735 A1 | 10/2009 | Sibalich et al. |
| 2009/0268023 A1 | 10/2009 | Hsieh |
| 2009/0273290 A1 | 11/2009 | Ziegenfuss |
| 2009/0278479 A1 | 11/2009 | Platner et al. |
| 2010/0001652 A1 | 1/2010 | Damsleth |
| 2010/0052557 A1 | 3/2010 | Van Der Veen et al. |
| 2010/0096460 A1 | 4/2010 | Carlson et al. |
| 2010/0123403 A1 | 5/2010 | Reed |
| 2010/0164406 A1 | 7/2010 | Kost et al. |
| 2010/0171442 A1 | 7/2010 | Draper et al. |
| 2010/0259193 A1 | 10/2010 | Umezawa et al. |
| 2010/0270945 A1 * | 10/2010 | Chang .............. H01F 30/04 315/294 |
| 2010/0271802 A1 | 10/2010 | Recker et al. |
| 2010/0309310 A1 | 12/2010 | Albright |
| 2010/0328946 A1 | 12/2010 | Borkar et al. |
| 2011/0001626 A1 | 1/2011 | Yip et al. |
| 2011/0006703 A1 | 1/2011 | Wu et al. |
| 2011/0026264 A1 | 2/2011 | Reed et al. |
| 2011/0204845 A1 * | 8/2011 | Paparo .............. H01F 38/14 320/108 |
| 2011/0215724 A1 | 9/2011 | Chakravarty et al. |
| 2011/0215731 A1 | 9/2011 | Jeong et al. |
| 2011/0215751 A1 | 9/2011 | Sato |
| 2011/0221346 A1 | 9/2011 | Lee et al. |
| 2011/0248812 A1 * | 10/2011 | Hu .............. H01F 29/14 336/221 |
| 2011/0251751 A1 | 10/2011 | Knight |
| 2011/0282468 A1 | 11/2011 | Ashdown |
| 2011/0310605 A1 | 12/2011 | Renn et al. |
| 2012/0001566 A1 | 1/2012 | Josefowicz et al. |
| 2012/0019971 A1 | 1/2012 | Flaherty et al. |
| 2012/0038490 A1 | 2/2012 | Verfuerth |
| 2012/0098439 A1 | 4/2012 | Recker et al. |
| 2012/0119669 A1 | 5/2012 | Melanson et al. |
| 2012/0119682 A1 | 5/2012 | Warton |
| 2012/0143383 A1 | 6/2012 | Cooperrider et al. |
| 2012/0153854 A1 | 6/2012 | Setomoto et al. |
| 2012/0169053 A1 | 7/2012 | Tchoryk, Jr. et al. |
| 2012/0169239 A1 | 7/2012 | Chen et al. |
| 2012/0181935 A1 | 7/2012 | Velazquez |
| 2012/0194054 A1 | 8/2012 | Johnston et al. |
| 2012/0209755 A1 | 8/2012 | Verfuerth et al. |
| 2012/0221154 A1 | 8/2012 | Runge |
| 2012/0224363 A1 | 9/2012 | Van De Ven |
| 2012/0230584 A1 | 9/2012 | Kubo et al. |
| 2012/0242254 A1 | 9/2012 | Kim et al. |
| 2012/0262069 A1 | 10/2012 | Reed |
| 2013/0033183 A1 | 2/2013 | Verfuerth et al. |
| 2013/0126715 A1 | 5/2013 | Flaherty |
| 2013/0131882 A1 | 5/2013 | Verfuerth et al. |
| 2013/0141000 A1 | 6/2013 | Wei et al. |
| 2013/0154488 A1 | 6/2013 | Sadwick et al. |
| 2013/0163243 A1 | 6/2013 | Reed |
| 2013/0193857 A1 | 8/2013 | Tlachac et al. |
| 2013/0229518 A1 | 9/2013 | Reed et al. |
| 2013/0235202 A1 | 9/2013 | Nagaoka et al. |
| 2013/0249429 A1 | 9/2013 | Woytowitz et al. |
| 2013/0249479 A1 * | 9/2013 | Partovi .............. H02J 7/025 320/108 |
| 2013/0293112 A1 | 11/2013 | Reed et al. |
| 2013/0340353 A1 | 12/2013 | Whiting et al. |
| 2014/0001961 A1 | 1/2014 | Anderson et al. |
| 2014/0028198 A1 | 1/2014 | Reed et al. |
| 2014/0055990 A1 | 2/2014 | Reed |
| 2014/0070964 A1 * | 3/2014 | Rupprath .......... H05B 33/0815 340/952 |
| 2014/0078308 A1 | 3/2014 | Verfuerth |
| 2014/0097759 A1 | 4/2014 | Verfuerth et al. |
| 2014/0159585 A1 | 6/2014 | Reed |
| 2014/0203714 A1 | 7/2014 | Zhang et al. |
| 2014/0225521 A1 | 8/2014 | Reed |
| 2014/0244044 A1 | 8/2014 | Davis et al. |
| 2014/0265894 A1 * | 9/2014 | Weaver ............. H05B 33/083 315/193 |
| 2014/0313719 A1 | 10/2014 | Wang et al. |
| 2015/0015716 A1 | 1/2015 | Reed et al. |
| 2015/0077019 A1 | 3/2015 | Reed et al. |
| 2015/0280782 A1 | 10/2015 | Airbinger et al. |
| 2015/0312983 A1 | 10/2015 | Hu et al. |
| 2016/0021713 A1 | 1/2016 | Reed |
| 2016/0150622 A1 | 5/2016 | Flinsenberg et al. |
| 2017/0055324 A1 | 2/2017 | Reed |

FOREIGN PATENT DOCUMENTS

| | | |
|---|---|---|
| EP | 1 734 795 A1 | 12/2006 |
| EP | 2 559 937 A1 | 2/2013 |
| EP | 1 459 600 B1 | 2/2014 |
| EP | 2 781 138 A1 | 9/2014 |
| FR | 2 883 306 A1 | 9/2006 |
| JP | 6-335241 A | 12/1994 |
| JP | 2001-333420 A | 11/2001 |
| JP | 2004-279668 A | 10/2004 |
| JP | 2004-320024 A | 11/2004 |
| JP | 2004-349065 A | 12/2004 |
| JP | 2005-93171 A | 4/2005 |
| JP | 2005-198238 A | 7/2005 |
| JP | 2005-310997 A | 11/2005 |
| JP | 2006-179672 A | 7/2006 |
| JP | 2006-244711 A | 9/2006 |
| JP | 2008-59811 A | 3/2008 |
| JP | 2008-509538 A | 3/2008 |
| JP | 2008-130523 A | 6/2008 |
| JP | 2008-159483 A | 7/2008 |
| JP | 2008-177144 A | 7/2008 |
| JP | 2008-529177 A | 7/2008 |
| JP | 2008-535279 A | 8/2008 |
| JP | 2010-504628 A | 2/2010 |
| KR | 10-2005-0078403 A | 8/2005 |
| KR | 10-2006-0071869 A | 6/2006 |
| KR | 10-2006-0086254 A | 7/2006 |
| KR | 10-2008-0100140 A | 11/2008 |
| KR | 10-2009-0042400 A | 4/2009 |
| KR | 10-0935736 B1 | 1/2010 |

(56) References Cited

FOREIGN PATENT DOCUMENTS

| KR | 20-2010-0007230 U | 7/2010 |
|---|---|---|
| KR | 10-1001276 B1 | 12/2010 |
| KR | 10-1044224 B1 | 6/2011 |
| KR | 10-1150876 B1 | 5/2012 |
| WO | 02/076068 A1 | 9/2002 |
| WO | 03/056882 A1 | 7/2003 |
| WO | 2005/003625 A1 | 1/2005 |
| WO | 2006/057866 A2 | 6/2006 |
| WO | 2007/023454 A1 | 3/2007 |
| WO | 2007/036873 A2 | 4/2007 |
| WO | 2008/030450 A2 | 3/2008 |
| WO | 2008/034242 A1 | 3/2008 |
| WO | 2009/040703 A2 | 4/2009 |
| WO | 2010/086757 A1 | 8/2010 |
| WO | 2010/133719 A1 | 11/2010 |
| WO | 2011/063302 A2 | 5/2011 |
| WO | 2011/129309 A1 | 10/2011 |
| WO | 2012/006710 A1 | 1/2012 |
| WO | 2012/142115 A2 | 10/2012 |
| WO | 2013/074900 A1 | 5/2013 |
| WO | 2014/018773 A1 | 1/2014 |
| WO | 2014/039683 A1 | 3/2014 |
| WO | 2014/078854 A1 | 5/2014 |

OTHER PUBLICATIONS

Extended European Search Report, dated May 3, 2016, for corresponding European Application No. 12771286.7, 9 pages.
Korean Office Action with English Translation, dated Nov. 18, 2015, for corresponding KR Application No. 10-2011-7014088, 14 pages.
Reed et al., "Adjustable Output Solid-State Lamp With Security Features," U.S. Appl. No. 61/561,616, filed Nov. 18, 2011, 30 pages.
Reed et al., "Apparatus and Method for Schedule Based Operation of a Luminaire," Amendment filed Jun. 7, 2016, for U.S. Appl. No. 14/552,274, 14 pages.
Reed, "Adjustable Output Solid-State Lighting Device," Notice of Allowance dated Feb. 25, 2016, for U.S. Appl. No. 13/707,123, 9 pages.
Office Action dated Jan. 18, 2017 for U.S. Appl. No. 14/806,500, Reed, "Electronic Control to Regulate Power for Solid-State Lighting and Methods Thereof," 18 pages.
Office Action dated Sep. 19, 2016, for U.S. Appl. No. 14/552,274, Reed et al., "Apparatus and Method for Schedule Based Operation of a Luminaire," 9 pages.
Reed, "Electronic Control to Regulate Power for Solid-State Lighting and Methods Thereof," Response Under 37 CFR 1.116 filed Dec. 5, 2016 for U.S. Appl. No. 14/806,500, 12 pages.
Extended European Search Report dated Aug. 25, 2016, for corresponding EP Application No. 14843796.5-1757, 6 pages.
Reed et al., "Apparatus and Method for Schedule Based Operation of a Luminaire" Amendment filed Dec. 7, 2016, for U.S. Appl. No. 14/552,274, 11 pages.
Reed et al., "Systems and Methods That Employ Object Recognition," Notice of Allowance dated Jul. 18, 2016, for U.S. Appl. No. 13/411,321, 15 pages.
Reed, "Apparatus and Method of Energy Efficient Illumination Using Received Signals," Office Action dated Aug. 23, 2016, for U.S. Appl. No. 14/557,275, 23 pages.
Reed, "Electronic Control to Regulate Power for Solid-State Lighting and Methods Thereof," Office Action dated Sep. 6, 2016 for U.S. Appl. No. 14/806,500, 18 pages.
Reed, "Low Power Photocontrol for Luminaire," Notice of Allowance dated Aug. 24, 2016, for U.S. Appl. No. 14/844,944, 7 pages.
"LCD Backlight I/O Ports and Power Protection Circuit Design," dated May 2, 2011, retrieved Jun. 10, 2011, retrieved from http://www.chipoy.info/gadgets/lcd-backlight-i-o-ports-and-power-pr . . . , 4 pages.
EE Herald, "Devices to protect High brightness LED from ESD,"dated Mar. 16, 2009, retrieved Jun. 10, 2011, retrieved from http://www.eeherald.com/section/new-products/np100779.html, 1 page.
Extended European Search Report dated Jan. 4, 2016, for corresponding EP Application No. 13823055.2-1802, 7 pages.
Extended European Search Report dated Oct. 21, 2015, for corresponding EP Application No. 13835001.2-1802, 7 pages.
Extended European Search Report, dated Aug. 13, 2014, for corresponding European Application No. 09826926.9, 8 pages.
Extended European Search Report, dated Oct. 15, 2015, for corresponding European Application No. 12825132.9-1802, 5 pages.
Extended European Search Report, dated Sep. 28, 2015, for corresponding European Application No. 12850159.0-1802, 6 pages.
Fairchild Semiconductor, "LED Application Design Guide Using Half-Bridge LLC Resonant Converter for 100W Street Lighting,"AN-9729, Fairchild Semiconductor Corporation, Rev. 1.0.0, Mar. 22, 2011, 17 pages.
Huang, "Designing an LLC Resonant Half-Bridge Power Converter," 2010 Texas Instruments Power Supply Design Seminar, SEM1900, Topic 3, TI Literature No. SLUP263, Copyright 2010, 2011, Texas Instruments Incorporated, 28 pages.
International Search Report, dated Dec. 13, 2010 for PCT/US2010/035649, 3 pages.
International Search Report, dated Dec. 15, 2010 for PCT/US2010/035658, 3 pages.
International Search Report, dated Dec. 28, 2010 for PCT/US2010/035651, 3 pages.
International Search Report, dated Dec. 30, 2013 for PCT/US2013/058266, 3 pages.
International Search Report, dated Feb. 26, 2014, for PCT/US2013/070794, 3 pages.
International Search Report, dated Feb. 27, 2013, for PCT/US2012/065476, 3 pages.
International Search Report, dated Jan. 14, 2013, for PCT/US2012/052009, 3 pages.
International Search Report, dated Jul. 9, 2009 for PCT/US2009/043171, 5 pages.
International Search Report, dated Jun. 21, 2010, for PCT/US2009/064625, 3 pages.
International Search Report and Written Opinion, dated May 7, 2015, for International Application No. PCT/US2015/013512, 15 pages.
International Search Report dated Nov. 11, 2014, for International Application No. PCT/US2014/047867, 3 pages.
International Search Report, dated Nov. 19, 2013 for PCT/US2013/052092, 4 pages.
International Search Report, dated Oct. 8, 2012 for PCT/US2012/033059, 3 pages.
International Search Report, dated Sep. 30, 2011, for PCT/US2011/021359, 3 pages.
Japanese Office Action, dated Jan. 6, 2015, for corresponding Japanese Application No. 2011-536564, 6 pages.
Kadirvel et al., "Self-Powered, Ambient Light Sensor Using bq25504," Texas Instruments, Application Report, SLUA629—Jan. 2012, 6 pages.
Korean Office Action with English Translation, dated May 16, 2016, for corresponding KR Application No. 10-2011-7014088, 22 pages.
Littelfuse, "Application Note: Protecting LEDs in Product Designs," 2009, 2 pages.
Panasonic Electronic Components, "LED Lighting Solutions," 2009, 6 pages.
Poplawski, "Exploring Flicker & LEDs,"2010 DOE SSL Market Introduction Workshop, U.S. Department of Energy, Jul. 22, 2010, 16 pages.
Reed et al., "Adjustable Output Solid-State Lamp With Security Features," Amendment filed Jun. 24, 2014, for U.S. Appl. No. 13/679,687, 11 pages.
Reed et al., "Adjustable Output Solid-State Lamp With Security Features," Notice of Allowance dated Aug. 29, 2014, for U.S. Appl. No. 13/679,687, 9 pages.
Reed et al., "Adjustable Output Solid-State Lamp With Security Features," Office Action dated Feb. 27, 2014, for U.S. Appl. No. 13/679,687, 11 pages.
Reed et al., "Adjustable Output Solid-State Lamp With Security Features," U.S. Appl. No. 61/561,616, filed Nov. 18, 2011, 33 pages.

(56) References Cited

OTHER PUBLICATIONS

Reed et al., "Apparatus and Method for Schedule Based Operation of a Luminaire" Amendment filed Jun. 1, 2015, for U.S. Appl. No. 14/552,274, 14 pages.
Reed et al., "Apparatus and Method for Schedule Based Operation of a Luminaire," Amendment filed Jun. 24, 2014, for U.S. Appl. No. 13/604,327, 14 pages.
Reed et al., "Apparatus and Method for Schedule Based Operation of a Luminaire," Notice of Allowance dated Jul. 7, 2014, for U.S. Appl. No. 13/604,327, 8 pages.
Reed et al., "Apparatus and Method for Schedule Based Operation of a Luminaire," Notice of Allowance dated Jun. 19, 2015, for U.S. Appl. No. 14/552,274, 9 pages.
Reed et al., "Apparatus and Method for Schedule Based Operations of a Luminaire," Office Action dated Mar. 2, 2015, for U.S. Appl. No. 14/552,274, 7 pages.
Reed et al., "Apparatus and Method for Schedule Based Operation of a Luminaire," Office Action dated Mar. 26, 2014, for U.S. Appl. No. 13/604,327, 10 pages.
Reed et al., "Apparatus and Method of Operating a Luminaire," Amendment filed Mar. 19, 2015, for U.S. Appl. No. 13/558,191, 20 pages.
Reed et al., "Apparatus and Method of Operating a Luminaire," Notice of Allowance dated Apr. 27, 2015, for U.S. Appl. No. 13/558,191, 8 pages.
Reed et al., "Apparatus and Method of Operating a Luminaire," Office Action dated Dec. 22, 2014, for U.S. Appl. No. 13/558,191, 17 pages.
Reed et al., "Apparatus, Method to Change Light Source Color Temperature with Reduced Optical Filtering Losses," U.S. Appl. No. 61/295,519, filed Jan. 15, 2010, 35 pages.
Reed et al., "Apparatus, Method to Change Light Source Color Temperature With Reduced Optical Filtering Losses," U.S. Appl. No. 61/406,490, filed Oct. 25, 2010, 46 pages.
Reed et al., "Apparatus, Method to Enhance Color Contrast in Phosphor-Based Solid State Lights," U.S. Appl. No. 61/534,722, filed Sep. 14, 2011, 53 pages.
Reed et al., "Electrically Isolated Heat Sink for Solid-State Light," U.S. Appl. No. 61/229,435, filed Jul. 29, 2009, 29 pages.
Reed et al., "Gas-Discharge Lamp Replacement with Passive Cooling," U.S. Appl. No. 61/174,913, filed May 1, 2009, 29 pages.
Reed et al., "Gas-Discharge Lamp Replacement," U.S. Appl. No. 61/052,924, filed May 13, 2008, 32 pages.
Reed et al., "Long-Range Motion Detection for Illumination Control," Amendment filed Apr. 22, 2013, for U.S. Appl. No. 12/784,080, 17 pages.
Reed et al., "Long-Range Motion Detection for Illumination Control," Amendment filed Apr. 28, 2014, for U.S. Appl. No. 12/784,080, 20 pages.
Reed et al., "Long-Range Motion Detection for Illumination Control," Amendment filed Dec. 10, 2015, for U.S. Appl. No. 14/500,512, 18 pages.
Reed et al., "Long-Range Motion Detection for Illumination Control," Amendment filed Sep. 27, 2013, for U.S. Appl. No. 12/784,080, 20 pages.
Reed et al., "Long-Range Motion Detection for Illumination Control," Notice of Allowance dated Jun. 20, 2014, for U.S. Appl. No. 12/784,080, 7 pages.
Reed et al., "Long-Range Motion Detection for Illumination Control," Office Action dated Dec. 21, 2012, for U.S. Appl. No. 12/784,080, 26 pages.
Reed et al., "Long-Range Motion Detection for Illumination Control," Office Action dated Jan. 30, 2014, for U.S. Appl. No. 12/784,080, 26 pages.
Reed et al., "Long-Range Motion Detection for Illumination Control," Office Action dated Jul. 22, 2013, for U.S. Appl. No. 12/784,080, 29 pages.
Reed et al., "Long-Range Motion Detection for Illumination Control," Office Action dated Mar. 4, 2016, for U.S. Appl. No. 14/500,512, 18 pages.
Reed et al., "Long-Range Motion Detection for Illumination Control," Office Action dated Sep. 17, 2015, for U.S. Appl. No. 14/500,512, 17 pages.
Reed et al., "Long-Range Motion Detection for Illumination Control," U.S. Appl. No. 61/180,017, filed May 20, 2009, 32 pages.
Reed et al., "Low-Profile Pathway Illumination System," Amendment filed Jul. 29, 2011, for U.S. Appl. No. 12/437,472, 19 pages.
Reed et al., "Low-Profile Pathway Illumination System," U.S. Appl. No. 61/051,619, filed May 8, 2008, 25 pages.
Reed et al., "Low-Profile Pathway Illumination System," Notice of Allowance, dated Oct. 14, 2011, for U.S. Appl. No. 12/437,472, 9 pages.
Reed et al., "Low-Profile Pathway Illumination System," Office Action, dated May 5, 2011, for U.S. Appl. No. 12/437,472, 24 pages.
Reed et al., "Luminaire With Adjustable Illumination Pattern," U.S. Appl. No. 14/939,856, filed Nov. 12, 2015, 69 pages.
Reed et al., "Remotely Adjustable Solid-State Lamp," Amendment filed Apr. 1, 2015, for U.S. Appl. No. 13/875,130, 14 pages.
Reed et al., "Remotely Adjustable Solid-State Lamp," Amendment filed Jul. 20, 2015, for U.S. Appl. No. 13/875,130, 15 pages.
Reed et al., "Remotely Adjustable Solid-State Lamp," Office Action dated Apr. 21, 2015, for U.S. Appl. No. 13/875,130, 10 pages.
Reed et al., "Remotely Adjustable Solid-State Lamp," U.S. Appl. No. 13/875,130, filed May 1, 2013, 65 pages.
Reed et al., "Systems and Methods That Employ Object Recognition," U.S. Appl. No. 13/411,321, filed Mar. 2, 2012, 51 pages.
Reed et al., "Remotely Adjustable Solid-State Lamp," U.S. Appl. No. 61/641,781, filed May 2, 2012, 65 pages.
Reed et al., "Systems and Methods That Employ Object Recognition," Amendment filed Jul. 7, 2015, for U.S. Appl. No. 13/411,321, 21 pages.
Reed et al., "Systems and Methods That Employ Object Recognition," Amendment filed Mar. 7, 2016, for U.S. Appl. No. 13/411,321, 16 pages.
Reed et al., "Systems and Methods That Employ Object Recognition," Amendment filed May 6, 2015, for U.S. Appl. No. 13/411,321, 20 pages.
Reed et al., "Systems and Methods That Employ Object Recognition," Amendment filed Nov. 21, 2014, for U.S. Appl. No. 13/411,321, 20 pages.
Reed et al., "Systems and Methods That Employ Object Recognition," Office Action dated Aug. 25, 2014, for U.S. Appl. No. 13/411,321, 35 pages.
Reed et al., "Systems and Methods That Employ Object Recognition," Office Action dated Dec. 7, 2015, for U.S. Appl. No. 13/411,321, 47 pages.
Reed et al., "Turbulent Flow Cooling for Electronic Ballast," U.S. Appl. No. 61/088,651, filed Aug. 13, 2008, 23 pages.
Reed, "Adjustable Output Solid-State Lighting Device," Amendment filed Apr. 2, 2015, for U.S. Appl. No. 13/707,123, 14 pages.
Reed, "Adjustable Output Solid-State Lighting Device," Amendment filed Jan. 8, 2016, for U.S. Appl. No. 13/707,123, 11 pages.
Reed, "Adjustable Output Solid-State Lighting Device," Office Acton dated Jan. 2, 2015, for U.S. Appl. No. 13/707,123, 24 pages.
Reed, "Adjustable Output Solid-State Lighting Device," Office Action dated Oct. 5, 2015, for U.S. Appl. No. 13/707,123, 24 pages.
Reed, "Adjustable Output Solid-State Lighting Device," U.S. Appl. No. 61/567,308, filed Dec. 6, 2011, 49 pages.
Reed, "Ambient Light Control in Solid State Lamps and Luminaires," Amendment filed Jan. 29, 2015, for U.S. Appl. No. 14/609,168, 12 pages.
Reed, "Ambient Light Control in Solid State Lamps and Luminaires," U.S. Appl. No. 61/933,733, filed Jan. 30, 2014, 8 pages.
Reed, "Apparatus and Method of Energy Efficient Illumination Using Received Signals," Amendment filed Jan. 2, 2014, for U.S. Appl. No. 13/085,301, 26 pages.
Reed, "Apparatus and Method of Energy Efficient Illumination Using Received Signals," Office Action dated Apr. 23, 2014, for U.S. Appl. No. 13/085,301, 12 pages.
Reed, "Apparatus and Method of Energy Efficient Illumination Using Received Signals," Office Action dated Oct. 1, 2013, for U.S. Appl. No. 13/085,301, 11 pages.

(56) References Cited

OTHER PUBLICATIONS

Reed, "Apparatus and Method of Energy Efficient Illumination Using Received Signals," Amendment filed Jul. 23, 2014, for U.S. Appl. No. 13/085,301, 12 pages.
Reed, "Apparatus and Method of Energy Efficient Illumination Using Received Signals," Notice of Allowance dated Jul. 30, 2014, for U.S. Appl. No. 13/085,301, 5 pages.
Reed, "Apparatus and Method of Energy Efficient Illumination Using Received Signals," U.S. Appl. No. 14/557,275, filed Dec. 1, 2014, 92 pages.
Reed, "Apparatus and Method of Energy Efficient Illumination," Amendment filed Sep. 30, 2014, for U.S. Appl. No. 14/329,508, 18 pages.
Reed, "Apparatus and Method of Energy Efficient Illumination," Notice of Allowance dated Apr. 11, 2014, for U.S. Appl. No. 13/943,537, 9 pages.
Reed, "Apparatus and Method of Energy Efficient Illumination," Notice of Allowance dated Nov. 5, 2014, for U.S. Appl. No. 14/329,508, 10 pages.
Reed, "Apparatus and Method of Energy Efficient Illumination," Office Action dated Aug. 28, 2014, for U.S. Appl. No. 14/329,508, 8 pages.
Reed, "Apparatus and Method of Energy Efficient Illumination," Office Action dated Nov. 27, 2013, for U.S. Appl. No. 13/943,537, 8 pages.
Reed, "Apparatus and Method of Energy Efficient Illumination," Amendment filed Apr. 2, 2013, for U.S. Appl. No. 12/784,093, 13 pages.
Reed, "Apparatus and Method of Energy Efficient Illumination," Amendment filed Apr. 4, 2013, for U.S. Appl. No. 12/784,091, 15 pages.
Reed, "Apparatus and Method of Energy Efficient Illumination," Amendment filed May 14, 2013, for U.S. Appl. No. 12/784,091, 9 pages.
Reed, "Apparatus and Method of Energy Efficient Illumination," Notice of Allowance dated Apr. 12, 2013, for U.S. Appl. No. 12/784,093, 9 pages.
Reed, "Apparatus and Method of Energy Efficient Illumination," Notice of Allowance dated May 23, 2013, for U.S. Appl. No. 12/784,091, 6 pages.
Reed, "Apparatus and Method of Energy Efficient Illumination," Office Action dated Apr. 24, 2013, for U.S. Appl. No. 12/784,091, 12 pages.
Reed, "Apparatus and Method of Energy Efficient Illumination," Office Action dated Dec. 5, 2012, for U.S. Appl. No. 12/784,091, 18 pages.
Reed, "Apparatus and Method of Energy Efficient Illumination," Office Action dated Dec. 5, 2012, for U.S. Appl. No. 12/784,093, 13 pages.
Reed, "Apparatus and Method of Energy Efficient Illumination," U.S. Appl. No. 61/333,983, filed May 12, 2010, 57 pages.
Reed, "Asset Management System for Outdoor Luminaires," U.S. Appl. No. 14/869,501, filed Sep. 29, 2015, 57 pages.
Reed, "Apparatus and Method of Energy Efficient Illumination," U.S. Appl. No. 61/346,263, filed May 19, 2010, 67 pages.
Reed, "Electronic Control to Regulate Power for Solid-State Lighting and Methods Thereof," Amendment filed Dec. 15, 2014, for U.S. Appl. No. 12/619,535, 21 pages.
Reed, "Electronic Control to Regulate Power for Solid-State Lighting and Methods Thereof," Amendment filed May 24, 2013, for U.S. Appl. No. 12/619,535, 21 pages.
Reed, "Electronic Control to Regulate Power for Solid-State Lighting and Methods Thereof," Amendment filed May 27, 2014, for U.S. Appl. No. 12/619,535, 22 pages.
Reed, "Electronic Control to Regulate Power for Solid-State Lighting and Methods Thereof," Amendment filed Oct. 30, 2013, for U.S. Appl. No. 12/619,535, 5 pages.
Reed, "Electronic Control to Regulate Power for Solid-State Lighting and Methods Thereof," Notice of Allowance dated Apr. 23, 2015, for U.S. Appl. No. 12/619,535, 8 pages.
Reed, "Electronic Control to Regulate Power for Solid-State Lighting and Methods Thereof," Office Action dated Aug. 14, 2014, for U.S. Appl. No. 12/619,535, 16 pages.
Reed, "Electronic Control to Regulate Power for Solid-State Lighting and Methods Thereof," Office Action dated Feb. 28, 2013, for U.S. Appl. No. 12/619,535, 17 pages.
Reed, "Electronic Control to Regulate Power for Solid-State Lighting and Methods Thereof," Office Action dated Jul. 30, 2013, for U.S. Appl. No. 12/619,535, 15 pages.
Reed, "Electronic Control to Regulate Power for Solid-State Lighting and Methods Thereof," Office Action dated Mar. 26, 2014, for U.S. Appl. No. 12/619,535, 16 pages.
Reed, "Electronic Control to Regulate Power for Solid-State Lighting and Methods Thereof," Office Action dated May 9, 2016 for U.S. Appl. No. 14/806,500, 18 pages.
Reed, "Electronic Control to Regulate Power for Solid-State Lighting and Methods Thereof," U.S. Appl. No. 61/115,438, filed Nov. 17, 2008, 51 pages.
Reed, "Electronic Control to Regulate Power for Solid-State Lighting and Methods Thereof," U.S. Appl. No. 61/154,619, filed Feb. 23, 2009, 62 pages.
Reed, "Electrostatic Discharge Protection for Luminaire," Amendment filed Jun. 17, 2013, for U.S. Appl. No. 13/212,074, 11 pages.
Reed, "Electrostatic Discharge Protection for Luminaire," Notice of Allowance dated Sep. 12, 2013, for U.S. Appl. No. 13/212,074, 6 pages.
Reed et al., "Electrostatic Discharge Protection for Luminaire," Office Action dated Mar. 15, 2013 for U.S. Appl. No. 13/212,074, 11 pages.
Reed, "High Efficiency Power Controller for Luminaire," U.S. Appl. No. 61/905,699, filed Nov. 18, 2013, 5 pages.
Reed, "Low Power Photocontrol for Luminaire," Office Action dated Apr. 27, 2016, for U.S. Appl. No. 14/844,944, 10 pages.
Reed, "Low Power Photocontrol for Luminaire," U.S. Appl. No. 14/844,944, filed Sep. 3, 2015, 45 pages.
Reed, "Low Power Photocontrol for Luminaire," U.S. Appl. No. 14/994,569, filed Jan. 13, 2016, 36 pages.
Reed, "Low Power Photocontrol for Luminaire," Amendment filed Jun. 13, 2016, for U.S. Appl. No. 14/844,944, 10 pages.
Reed, "Low Power Photocontrol for Luminaire," U.S. Appl. No. 62/137,666, filed Mar. 24, 2015, 36 pages.
Reed, "Luminaire With Adjustable Illumination Pattern," U.S. Appl. No. 62/114,826, filed Feb. 11, 2015, 68 pages.
Reed, "Luminaire With Ambient Sensing and Autonomous Control Capabilities," Amendment filed Mar. 13, 2015, for U.S. Appl. No. 13/786,332, 23 pages.
Reed, "Luminaire With Ambient Sensing and Autonomous Control Capabilities," Office Action dated Dec. 17, 2014, for U.S. Appl. No. 13/786,332, 20 pages.
Reed, "Luminaire With Ambient Sensing and Autonomous Control Capabilities," U.S. Appl. No. 13/786,332, filed Mar. 5, 2013, 86 pages.
Reed, "Luminaire With Ambient Sensing and Autonomous Control Capabilities," U.S. Appl. No. 61/728,150, filed Nov. 19, 2012, 83 pages.
Reed, "Luminaire With Atmospheric Electrical Activity Detection and Visual Alert Capabilities," Notice of Allowance dated Jul. 1, 2014, for U.S. Appl. No. 13/786,114, 9 pages.
Reed, "Luminaire With Atmospheric Electrical Activity Detection and Visual Alert Capabilities," U.S. Appl. No. 61/649,159, filed Aug. 28, 2012, 52 pages.
Reed, "Luminaire With Switch-Mode Converter Power Monitoring," Notice of Allowance dated Nov. 18, 2015, for U.S. Appl. No. 14/074,166, 9 pages.
Reed, "Luminaire With Switch-Mode Converter Power Monitoring," U.S. Appl. No. 61/723,675, filed Nov. 7, 2012, 73 pages.
Reed, "Photocontrol for Luminaire Consumes Very Low Power," U.S. Appl. No. 61/849,841, filed Jul. 24, 2013, 41 pages.
Reed, "Photocontrol for Luminaire Consumes Very Low Power," U.S. Appl. No. 14/158,630, filed Jan. 17, 2014, 71 pages.
Reed, "Resonant Network for Reduction of Flicker Perception in Solid State Lighting Systems," U.S. Appl. No. 61/527,029, filed Aug. 24, 2011, 41 pages.

(56) References Cited

OTHER PUBLICATIONS

Reed, "Resonant Network for Reduction of Flicker Perception in Solid State Lighting Systems," Notice of Allowance dated Sep. 30, 2013, for U.S. Appl. No. 13/592,590, 9 pages.
Reed, "Solid State Hospitality Lamp," Office Action dated Apr. 15, 2016, for U.S. Appl. No. 13/973,696, 11 pages.
Reed, "Solid State Hospitality Lamp," U.S. Appl. No. 61/692,619, filed Aug. 23, 2012, 32 pages.
Reed, "Solid State Lighting, Drive Circuit and Method of Driving Same," Notice of Allowance dated Aug. 4, 2015, for U.S. Appl. No. 13/875,000, 10 pages.
Reed, "Solid State Lighting, Drive Circuit and Method of Driving Same," U.S. Appl. No. 61/640,963, filed May 1, 2012, 24 pages.
Reed, "Systems, Methods, and Apparatuses for Using a High Current Switching Device as a Logic Level Sensor," Notice of Allowance for U.S. Appl. No. 14/179,737, dated Nov. 6, 2015, 9 pages.
Reed, "Systems, Methods, and Apparatuses for Using a High Current Switching Device as a Logic Level Sensor," U.S. Appl. No. 14/179,737, filed Feb. 13, 2014, 48 pages.
Reed, "Systems, Methods, and Apparatuses for Using a High Current Switching Device as a Logic Level Sensor," U.S. Appl. No. 61/764,395, filed Feb. 13, 2013, 48 pages.
Renesas Electronics, "Zener Diodes for Surge Absorption—Applications of high-intensity LED," Apr. 2010, 1 page.
Renn et al., "Solid State Lighting Device and Method Employing Heat Exchanger Thermally Coupled Circuit Board," U.S. Appl. No. 61/357,421, filed Jun. 22, 2010, 49 pages.
Tyco Electronics, "Circuit Protection," retrieved Jun. 10, 2011, retrieved from http://www.tycoelectronics.com/en/products/circuit-protection.html, 2 pages.
Written Opinion, dated Sep. 30, 2011, for PCT/US2011/021359, 4 pages.
Written Opinion, dated Dec. 13, 2010 for PCT/US2010/035649, 4 pages.
Written Opinion, dated Dec. 15, 2010 for PCT/US2010/035658, 3 pages.
Written Opinion, dated Dec. 28, 2010 for PCT/US2010/035651, 3 pages.
Written Opinion, dated Dec. 30, 2013 for PCT/US2013/058266, 8 pages.
Written Opinion, dated Feb. 26, 2014, for PCT/US2013/070794, 10 pages.
Written Opinion, dated Feb. 27, 2013, for PCT/US2012/065476, 8 pages.
Written Opinion, dated Jan. 14, 2013, for PCT/US2012/052009, 5 pages.
Written Opinion, dated Jul. 9, 2009 for PCT/US2009/043171, 8 pages.
Written Opinion, dated Jun. 21, 2010 for PCT/US2009/064625, 5 pages.
Written Opinion dated Nov. 11, 2014, for International Application No. PCT/US2014/047867, 5 pages.
Written Opinion, dated Nov. 19, 2013 for PCT/US2013/052092, 7 pages.
Written Opinion, dated Oct. 8, 2012 for PCT/US2012/033059, 3 pages.
Notice of Allowance dated Mar. 24, 2017, for Reed, "Apparatus and Method of Energy Efficient Illumination Using Received Signals," U.S. Appl. No. 14/557,275, 23 pages.
Reed, "Electronic Control to Regulate Power for Solid-State Lighting and Methods Thereof," Amendment filed May 23, 2017 for U.S. Appl. No. 14/806,500, 11 pages.
Reed, "High Reliability Photocontrol Controls With 0 to 10 Volt Dimming Signal Line and Method," U.S. Appl. No. 62/507,730, filed May 17, 2017, 17 pages.
Vendetti et al., "Luminaire Dimming Module Uses 3 Contact NEMA Photocontrol Socket," U.S. Appl. No. 15/496,985, filed Apr. 25, 2017, 23 pages.
Office Action dated Feb. 17, 2017, for U.S. Appl. No. 14/939,856, Reed et al., "Luminaire With Adjustable Illumination Pattern," 13 pages.
Notice of Allowance dated Mar. 16, 2017, for U.S. Appl. No. 14/552,274, Reed et al., "Apparatus and Method for Schedule Based Operation of a Luminaire," 9 pages.

\* cited by examiner

HIGH EFFICIENCY POWER CONTROLLER FOR LUMINAIRE

BACKGROUND

Technical Field

The present disclosure relates to illumination, and more particularly to efficient power control for illumination systems.

Description of the Related Art

Luminaires enjoy widespread use in a variety of industrial, commercial, and municipal applications. Such applications can include general or area lighting of workspaces, roadways, parking lots, and the like. Multiple luminaires are typically arranged in patterns and positioned at intervals sufficient to provide a minimum overall level of illumination across the area of interest. For example, luminaires may be spaced at intervals along a driveway in a multilevel parking garage to provide an overall level of illumination that permits safe ingress and egress by pedestrians as well as permits safe operation of motor vehicles within the parking garage. In a similar manner, luminaires may be spaced at intervals throughout a commercial center parking lot to promote safe operation of motor vehicles, permit safe ingress and egress by customers, and foster a sense of safety and well-being for business patrons within the commercial center. Similarly, a number of luminaires may be spaced along a roadway to provide a level of illumination permitting safe operation of motor vehicles on the roadway and, where applicable, safe passage of pedestrians on sidewalks adjoining the roadway.

Energy conservation has become of ever-increasing importance. Efficient use of energy can result in a variety of benefits, including financial benefits such as cost savings and environmental benefits such as preservation of natural resources and reduction in "green house" (e.g., $CO_2$) gas emissions.

Residential, commercial, and street lighting which illuminate interior and exterior spaces consume a significant amount of energy. Conventional lighting devices or luminaires exist in a broad range of designs, suitable for various uses. Lighting devices employ a variety of conventional light sources, for example incandescent lamps, fluorescent lamps such as high-intensity discharge (HID) lamps (e.g., mercury vapor lamps, high-pressure sodium lamps, metal halide lamps).

One approach to reducing energy consumption associated with lighting systems employs higher efficiency light sources. Use of higher efficiency light sources may, for instance, include replacing incandescent lamps with fluorescent lamps or even with solid-state light sources (e.g., light emitting diodes (LEDs), organic LEDs (OLEDs), polymer LEDs (PLEDs)) to increase energy efficiency.

Solid-state light sources require a power converter to operate off of alternating current (AC) lines, also referred to as AC mains. The converter is typically a switch mode converter topology, such as flyback converter, LLC resonant converter, or the like. Other power converters that may be used are of the "AC LED" type, which switch in, or out, a variable number of solid-state light sources so that the forward voltage drop is close to the rectified AC line voltage.

Solid-state light sources are best powered using a constant current. This is due to the constant forward voltage ($V_f$) of the solid-state light source, for example, 3 volts. If a constant voltage converter is used, small variations in $V_f$ of the solid-state light source(s) (e.g., due to temperature) will result in large variations in current through the solid-state light source(s). These large variations in current will cause significant changes in light output and possibly damage the solid-state light source(s) by exceeding its rated power handling capacity.

BRIEF SUMMARY

An illumination system may be summarized as including: one or more magnetic cores; one or more control windings, each of the one or more control windings wound around at least a portion of at least one of the one or more magnetic cores; a control circuit electrically coupled to the one or more control windings, the control circuit controls a flow of direct current through the one or more control windings which causes a biasing magnetic flux in the one or more magnetic cores; one or more power windings, each of the one or more power windings wound around at least a portion of at least one of the one or more magnetic cores, the one or more power windings which in operation receive alternating current from an alternating current supply; a plurality of solid-state light sources electrically coupled to the one or more power windings; and a rectifier electrically coupled to the one or more power windings and to the plurality of solid-state light sources, wherein in operation the rectifier provides a direct current to drive the plurality of solid-state light sources.

The plurality of solid-state light sources may be light emitting diodes (LEDs). In operation the one more power windings may receive alternating current from the alternating current supply that operates at approximately 50 or 60 Hertz. The illumination system may further include: a feedback circuit that communicatively couples a feedback current to the control circuit which controls a flow of direct current through the plurality of solid-state light sources to a defined instantaneous level. The feedback circuit may be electrically isolated from the plurality of solid-state light sources. The control circuit may implement a power factor correction transfer function which controls the flow of direct current through the one or more control windings which controls the flow of alternating current through the one or more power windings in a manner which improves the power factor of the illumination system. The control circuit may receive a measure of at least one of an input voltage or a phase angle of the alternating current supply. The control circuit may include at least one microcontroller that implements the power factor correction transfer function. The control circuit may include at least one nontransitory processor-readable storage medium that stores the power factor correction transfer function, and which is communicatively coupled to the microcontroller, and wherein the microcontroller receives a measure of at least one of an input voltage or a phase angle of the alternating current supply, and uses the measure to index into a table of direct current control output values and retrieve a direct current control output value that corrects the power factor of the power delivered to the plurality of solid-state light sources. The illumination system may further include: a power factor correction capacitor electrically coupled across terminals of the alternating current supply. The one or more power windings may not electrically galvanically isolate the plurality of solid-state light sources from the alternating current supply. The one or more power windings may electrically galvanically isolate the plurality of solid-state light sources from the alternating current supply. More than one set of power windings may drive a plurality of separated solid-state light sources controlled by one or more common or separate control windings. The illumination system may further include: a flicker control circuit comprising a passive resonating circuit electrically coupled to the rectifier to increase a frequency of an output signal of the rectifier to a frequency that is sufficiently high that a flicker from the plurality of solid-state light sources is undetectable by an unaided human eye. The rectifier may include at least two solid-state rectifiers. The rectifier may include at least four solid-state rectifiers. The one or more magnetic cores may include a magnet core having a plurality of legs, the one or more control windings wound around a first leg, the one or more power windings wound around a second leg different from the first leg. The one or more magnetic cores may include at least two magnetic cores, the one or more control windings are wound around at least a portion of each of the at least two magnetic cores, and the one or more power windings are wound around at least a portion of each of the at least two magnetic cores.

A drive circuit to drive a plurality of solid-state light sources of an illumination system may be summarized as including: a magnetic core; a control windings wound around at least a portion of the magnetic core; a control circuit electrically coupled to the control winding, the control circuit controls a flow of direct current through the control winding which causes a biasing magnetic flux in the magnetic core; a power winding wound around at least a portion of the magnetic core; a rectifier electrically coupled to the power winding and to the plurality of solid-state light sources; and wherein in operation the power winding receives alternating current from an alternating current supply and delivers direct current to the plurality of solid-state light sources via the rectifier.

A method of operation for an illumination system including a plurality of solid-state light sources may be summarized as including: receiving an alternating current signal at an input terminal; rectifying the alternating current signal with a rectifier; providing the rectified current signal to the plurality of solid-state light sources via one or more power windings wound around one or more magnetic cores; and selectively controlling a flow of direct current through one or more control windings wound around the one or more magnetic cores to control the rectified current signal provided to the plurality of solid-state light sources.

Receiving an alternating current signal at an input terminal may include receiving an alternating current signal that operates at approximately 50 or 60 Hertz. The method may further include: receiving a feedback signal indicative of direct current that flows through the plurality of solid-state light sources; and wherein selectively controlling a flow of direct current through one or more control windings may include selectively controlling a flow of direct current through one or more control windings based at least in part on the received feedback signal. Receiving a feedback signal indicative of direct current that flows through the plurality of solid-state light sources may include receiving a feedback signal that is electrically isolated from the plurality of solid-state light sources. The method may further include: implementing a power factor correction transfer function which controls the flow of direct current through the one or more control windings which controls the flow of alternating current through the one or more power windings in a manner which improves the power factor of the illumination system. The method may further include: receiving a signal indicative of at least one of an input voltage or a phase angle of the alternating current signal. The method may further include: increasing a frequency of the rectified current signal with a resonant network including passive electrical elements to reduce a detectability of amplitude variations in the rectified current signal by an unaided human eye as emitted by the plurality of solid-state light sources. Rectifying the alternating current signal may include rectifying the alternating current signal with at least two solid-state rectifiers. Rectifying the alternating current signal may include rectifying the alternating current signal with at least four solid-state rectifiers.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1:
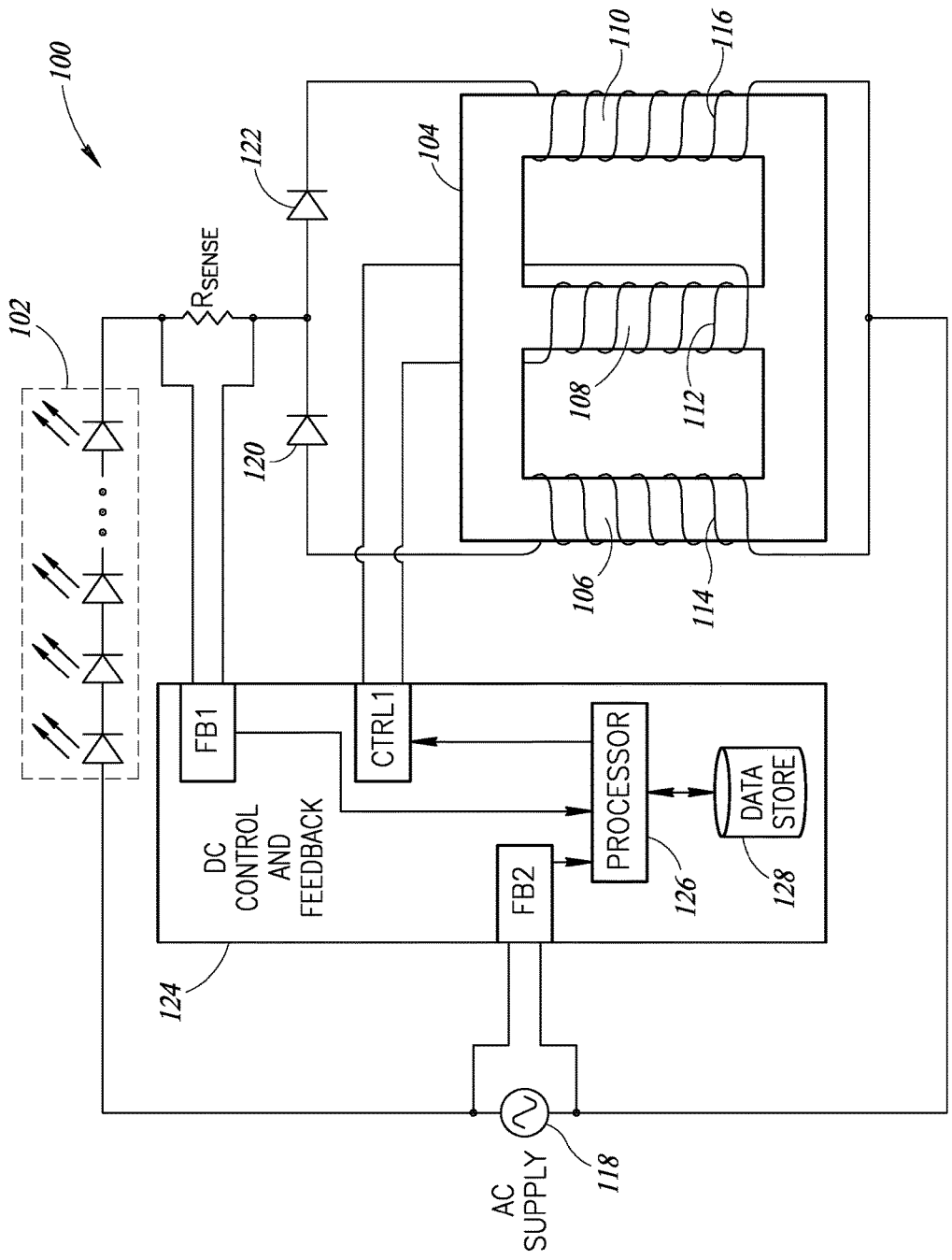
FIG. 1 is a schematic diagram of an illumination system having a drive circuit that employs a magnetic amplifier with a magnetic core and a feedback circuit to form a power converter that powers solid-state light sources, according to at least one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the various embodiments have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Additionally, the terms "lighting," "luminous output" and "illumination" are used herein interchangeably. For instance, the phrases "level of illumination" or "level of light output" have the same meanings. In addition, for instance, the phrases "illumination source" and "light source" have the same meanings.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the Disclosure provided herein are for convenience only and do not interpret the scope or meaning of the embodiments.

Implementations of the present disclosure are directed to lighting or illumination systems having drive circuits that employ a magnetic amplifier ("mag-amp") and one or more feedback circuits to form a power converter that powers solid-state light sources.

Generally, the drive circuits disclosed herein utilize a magnetic amplifier that includes one or more magnetic cores which provides a controllable reluctance for magnetic flux. The magnetic amplifiers include one or more power windings which receive energy from an alternating current (AC) supply (e.g., AC mains) and delivers rectified AC current as direct current (DC) to one or more solid-state light sources. The magnetic amplifiers also include one or more control windings coupled to a DC control source. The one or more control windings provide a control current that generates biasing magnetic flux to control the magnetic saturation of the one or more magnetic cores. The amount of control current fed into the control winding by the DC control source sets the voltage on the one or more power windings used to power the one or more solid-state light sources.

The drive circuits may have two or more rectifiers (e.g., solid-state rectifiers) to provide a direct current to drive the solid-state light sources (e.g., LEDs) and also to isolate the one or more control windings from interference from the magnetic flux of the one or more power windings.

Advantageously, the drive circuits disclosed herein may operate at a low frequency (e.g., 50 Hertz, 60 Hertz) compared to switch mode power controllers which operate at tens or hundreds of kilohertz. Thus, the drive circuits discussed herein generate almost no electromagnetic interference (EMI).

The drive circuits disclosed herein also have few components compared to traditional switch mode solid-state light source power converters, thereby enhancing operational life and providing high reliability. Due to the large inductances present in AC power sources, the drive circuits disclosed herein also have substantial inherent resistance to AC spikes and transients, for example, lightning-induced transient voltages and currents, making surge protection circuitry less expensive.

In some implementations, a feedback current may be applied to the one or more control windings to set the flow of current through the solid-state light sources to an appropriate instantaneous level. In some implementations, this feedback may be electrically isolated (e.g., optical isolation, magnetic isolation) from the solid-state light sources.

FIG. 1 shows a schematic diagram of a lighting or illumination system 100 that utilizes a magnetic amplifier to drive a plurality of solid-state light sources 102 (e.g., light emitting diodes (LEDs), organic LEDs (OLEDs), polymer LEDs (PLEDs)). The plurality of solid-state light sources 102 may include any number of light sources (e.g., 10 light sources, 50 light sources). The illumination system 100 includes a magnetic core 104 that comprises three legs: a left leg 106, a center leg 108 and a right leg 110. A control winding 112 is wound around the center leg 108 of the magnetic core 104. The magnetic core 104 is a saturable reactor in the sense that the core can be deliberately saturated by a direct electric current in the control winding 112. Once saturated, the inductance of the magnetic core 104 drops dramatically, which decreases the inductive reactance of the core allows for increased flow of alternating current, as discussed further below.

The illumination system 100 also includes power windings 114, 116 wound around the left leg 106 and the right leg 110, respectively, of the magnetic core 104. The power windings 114, 116 are electrically coupled to an alternating current supply 118 (e.g., AC mains). The power windings 114, 116 are also electrically coupled to the plurality of solid-state light sources 102 through rectifiers 120, 122, respectively. In some implementations, the rectifiers 120, 122 are solid-state rectifiers (e.g., diodes).

Equal turns in the power windings 114, 116 set up equal AC magnetomotive forces which cancel in the center leg 108. Thus, no fundamental AC voltage is induced in the control winding 112, but DC flux flows in both the left leg 106 and the right leg 110 of the magnetic core 104. A change of direct current in the control winding 112 causes a change in the total flux linking the power windings 114, 116 and hence a change in inductance.

The control winding 112 is electrically coupled to a controller or control circuit 124 at a control output CTRL1 thereof. In the illustrated implementation, the control circuit 124 is in the form of a microcontroller that includes one or more processors 126 and one or more nontransitory processor- or computer-readable storage media 128 coupled to the one or more processors. The control circuit 124 is operative to control the flow of direct current in the control winding 112, which controls the current flow through the power windings 114, 116 that is used to drive the solid-state light sources 102.

In some implementations, the control circuit 124 may include an analog circuit, a digital circuit, or a combination thereof. The processor 126 may be implemented as one or more microprocessors, microcomputers, microcontrollers, digital signal processors, central processing units, state machines, logic circuitries, and/or any devices that manipulate signals based on operational instructions. Among other capabilities, the processor 126 fetches and executes processor-readable instructions stored in a nontransitory memory.

In the illustrated implementation, a sense resistor $R_{SENSE}$ is provided in series with the plurality of solid-state light sources 102. A feedback input FB1 of the control circuit 124 is electrically coupled across the sense resistor $R_{SENSE}$ to sense a voltage drop across the sense resistor. The sensed feedback signal may be used by the one or more processors 126 of the control circuit 124 to determine an instantaneous current flowing through the plurality of solid-state light sources 102.

Using the feedback signal from the sense resistor $R_{SENSE}$, the control circuit 124 may selectively control the current in the control winding 112 to control the current in the power windings 114, 116 that drives the solid-state light sources 102. Thus, the solid-state light sources 102 may be selectively turned ON, turned OFF or dimmed by the control circuit 124.

In some implementations, a transfer function may be implemented in the control circuit 124 which controls the control current in the control winding 112 such that the power windings 114, 116 control the current flow to the solid-state light sources 102 in a manner which makes the power factor (PF) of the illumination system 100 to be substantially closer to the ideal PF of one (1) than would be the case with a feedback circuit which only represented the current flowing through the solid-state light sources. In some implementations, this power factor correction (PFC) transfer function is implemented using a processor-based controller, such as a microcontroller. For example, a microcontroller may implement the PFC transfer function using one or more lookup tables, one or more equations or models, etc.

In some implementations, the PFC transfer function is stored in the nontransitory processor-readable storage medium 128 and the control circuit 124 senses or measures an input voltage and/or phase angle of the AC supply at a feedback input FB2. The processor 126 of the control circuit 124 may utilize the measured input voltage and/or phase angle to determine the control current output value to provide at the control output CTRL1 that corrects the power factor. For example, the control circuit 124 may use the measured value or values to index into a table of control current output values and retrieve the control current value that corrects the power factor.

Figure 2:
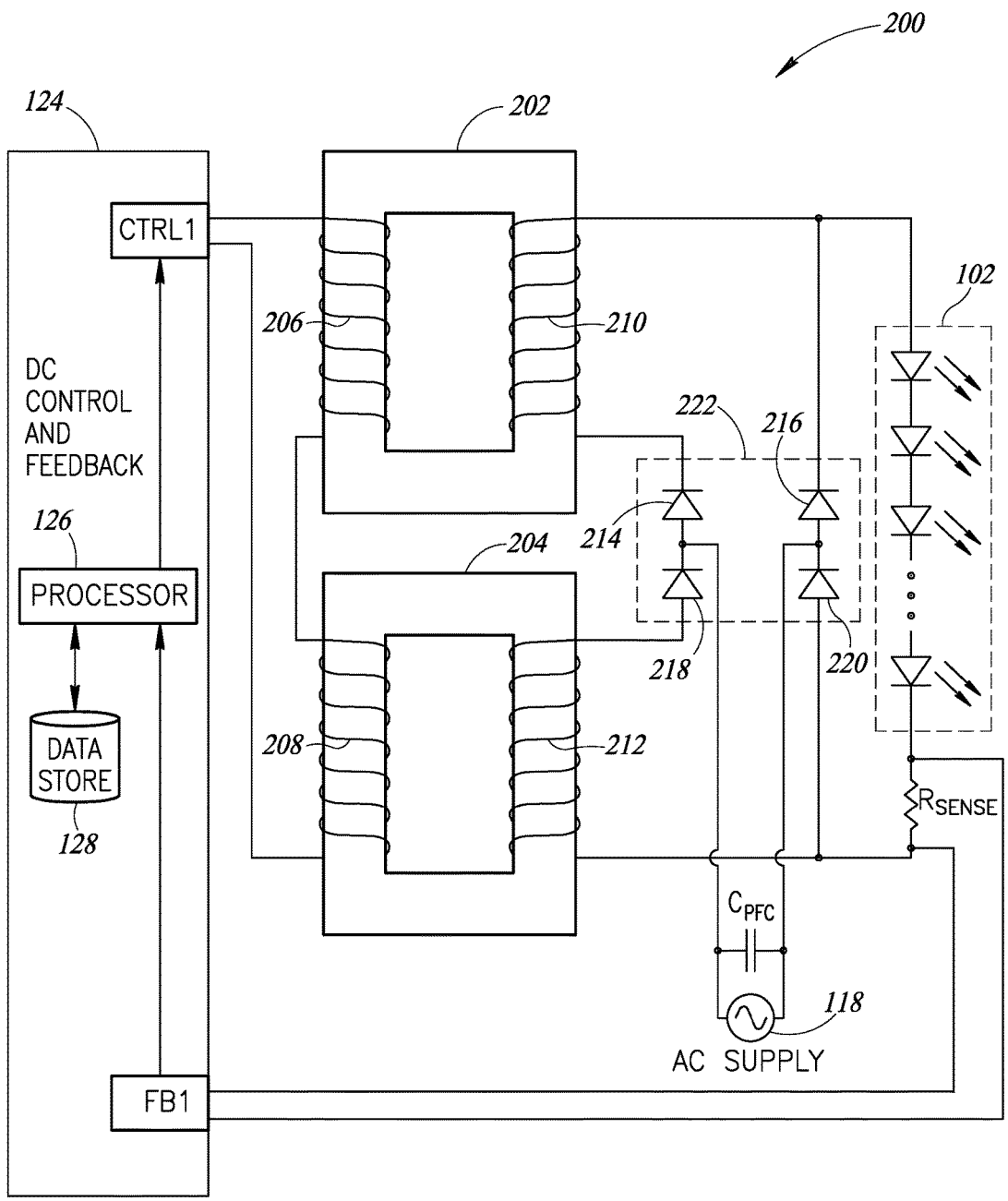
FIG. 2 is a schematic diagram of an illumination system having a drive circuit that employs a magnetic amplifier with two magnetic cores and a feedback circuit to form a power converter that powers solid-state light sources, according to at least one illustrated embodiment.

FIG. 2 shows a schematic diagram for another implementation of a lighting or illumination system 200. For the sake of brevity, a description will not repeated for features having the same reference numbers as features illustrated in FIG. 1. The illumination system 200 includes two magnetic cores 202, 204 which are provided with control windings 206, 208, respectively, and power windings 210, 212, respectively. A plurality of solid-state light sources 102 is electrically coupled in series with an AC source 118 (e.g., AC mains). The power windings 210, 212 are coupled in parallel with each other. Rectifiers 214, 216, 218, 220 are coupled to the power windings 210, 212 to form a bridge rectifier 222 which provides direct current to drive the plurality of solid-state light sources 102 during operation.

The control circuit 124 is electrically coupled to the control windings 206, 208. As noted above, the control circuit 124 utilizes a feedback signal received at feedback input FB1 to control the direct current in the control windings 206, 208 which in turn controls the current in the power windings 210, 212 supplied to the light source 102.

In the implementation shown in FIG. 2, a capacitor $C_{PFC}$ is electrically coupled across the AC supply 118. The capacitor $C_{PFC}$ operates as a reactive current generator, which improves the power factor of the illumination system 200, thereby reducing the total amount of power used by the illumination system during operation.

Figure 3:
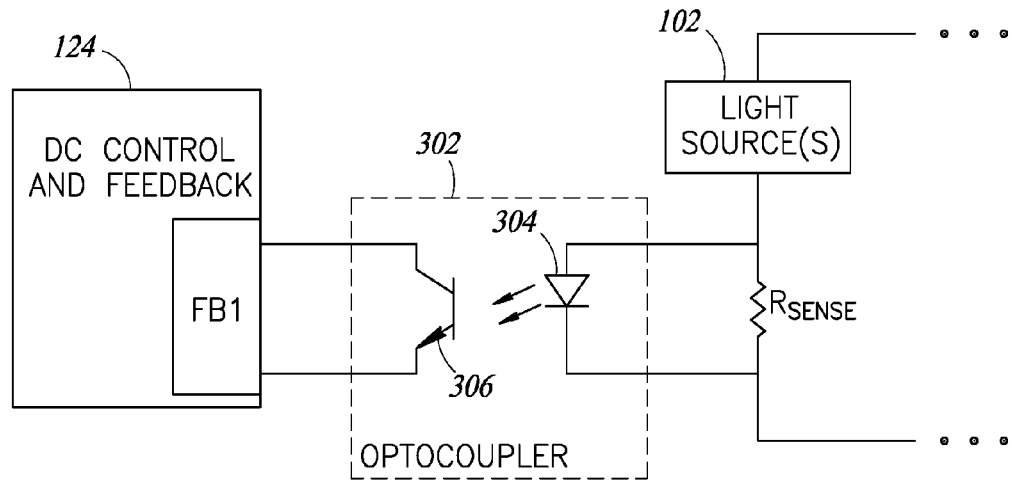
FIG. 3 is a schematic diagram of a portion of a control system for an illumination system that includes an optically isolated feedback system, according to at least one illustrated embodiment.

FIG. 3 shows a partial schematic view of a lighting or illumination system 300 that includes an optical isolator or optocoupler 302 disposed between the sensor resistor $R_{SENSE}$ and the feedback input FB1 of the control circuit 124. The optocoupler 302 operates to electrically isolate the solid-state light sources 102 from the control circuit 124. In the illustrated implementation, the optocoupler 302 includes an LED 304 and a phototransistor 306 disposed proximate the LED (e.g., in the same opaque package). Other types of optical source-sensor combinations may include LED-photodiode, LED-light activated silicon-controlled rectifier (LASCR), lamp-photoresistor pairs, etc. In some implementations, the light source 102 may be electrically isolated from the control circuit using other types of isolation, such as inductive isolation (e.g., isolation transformer). In some implementations, the power windings are such that the solid-state light source (e.g., LED(s)) load is not electrically galvanically isolated from the AC supply. In some implementations, the power windings are such that the solid-state light source (e.g., LED(s)) load is electrically galvanically isolated from the AC supply to obtain a Class II or higher safety rating. Such may be implemented using an isolation transformer, for example. In some implementations, more than one set of power windings are used to drive separated solid-state light source loads (e.g., LED(s)) that are controlled by common or separate control windings.

Figure 4:
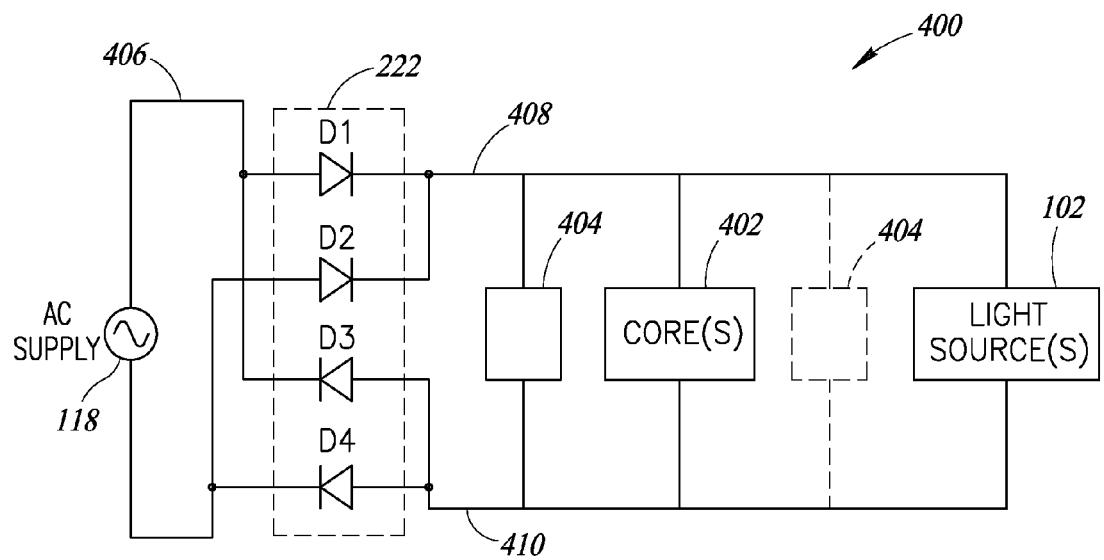
FIG. 4 is a schematic diagram of an illumination system that includes a passive resonant circuit, according to at least one illustrated embodiment.

FIG. 4 shows a lighting or illumination system 400, according to another implementation. The illumination system 400 includes a solid-state light source 102, an alternating current (AC) power supply 118, an AC signal conditioner or rectifier circuit 222, one or more magnetic cores 402, and a passive resonating circuit 404. As shown in dashed lines, the passive resonating circuit 404 may be electrically coupled between the one or more magnetic cores 402 and the light source 102 instead of between the rectifier circuit 222 and the magnetic core(s). The passive resonating circuit 404 may be operative to decrease perceived optical flicker in the solid-state light source 102.

The solid-state light source 102 may include a string of LEDs. Each of the LEDs may have a forward voltage drop in the range of 2.5-4.5 volts, for example. A voltage applied to an LED that is below this range may be insufficient to cause the LED to emit light, and a voltage applied to an LED that is above this range may render the LED inoperable or may significantly reduce the lifespan of the LED. Thus, for example a continuous string of 40 LEDs that are connected electrically in series may operate by receiving a voltage in the range of 100-180 volts (i.e., 2.5 volts×40 to 4.5 volts×40). According to other implementations, the solid-state light source 102 may include multiple strings of LEDs with each of the strings of LEDs electrically coupled in parallel to each of the other strings of LEDs.

The power supply 118 supplies an AC power signal consisting of a voltage and a current to a node 406. The frequency and amplitude of the AC power signal supplied by the power supply 118 may span a range of values. The frequency of the AC power signal may be any frequency greater than 30 hertz, for example. The power supply 118 may supply AC voltage and current at, for example, 50 hertz in some parts of the world or 60 hertz in North America. Alternatively, the power supply 118 may supply the AC power signal as a rectified alternating current.

The amplitude of the AC voltage supplied by the power supply 118 may span a wide range of values. The amplitude of the AC voltage may range from 3 volts to several-hundred volts, depending upon the characteristics of the light source 102. For example, an AC voltage having an amplitude of 3 volts may be desirable when the light source 102 is a single LED or includes multiple LEDs coupled electrically in parallel. In North America, the amplitude of the AC voltage supplied to light fixtures and receptacles is approximately 170 volts zero-to-peak, or approximately 110-120 volts root-mean-squared (rms) zero-to-peak. Accordingly, the voltage supplied to a typical North American light receptacle (~120 Vrms) is suitable to meet the operational range (141-187 volts zero to peak) of a string of 50 LEDs as determined by a forward-voltage range of 2.5-4.5 volts per each LED, typically 3.25V at rated LED current.

The AC conditioning circuit 222 may be coupled to the AC power supply 118 at the node 406 to receive the AC power signal. From the AC power signal, the AC conditioning circuit 222 may generate a rectified output signal having a frequency that is twice the frequency of the received AC power signal. Alternatively, the AC conditioning circuit 222 may be configured to generate a rectified output signal having a frequency that is greater than the frequency of the received AC power signal that is already a rectified alternating current signal. The frequency is determined by inverting a period of the rectified output signal. A period of the rectified output signal is the time elapsed between one amplitude maximum (voltage or current) to a next amplitude maximum.

The AC conditioning circuit 222 may be a passive circuit, such as a full-wave diode rectifier bridge, as illustrated. Diodes D1-D4 may be configured, as known in the art, to receive the AC power signal and generate the rectified output signal. Although rectified power signals are commonly considered to be direct current (DC) signals, the rectified output signal will be referred to as having a frequency that is the reciprocal of the period, discussed above.

The AC conditioning circuit 222 may generate the rectified output signal at a first frequency at a node 408 with reference to a node 410. The passive resonating circuit 404 may be electrically coupled to the AC conditioning circuit 222 to receive the rectified output signal at the node 408. Examples of the passive resonating circuit 404 are shown in FIGS. 5A-5C and are discussed below.

Figure 5A:
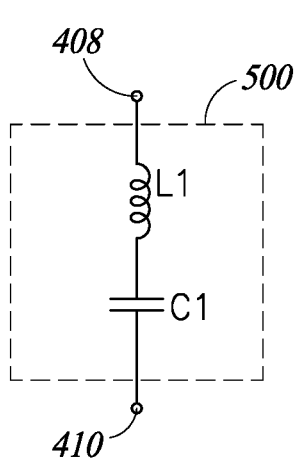
FIG. 5A is a schematic diagram of a passive resonant circuit of an illumination system, according to at least one illustrated embodiment.
Figure 5B:
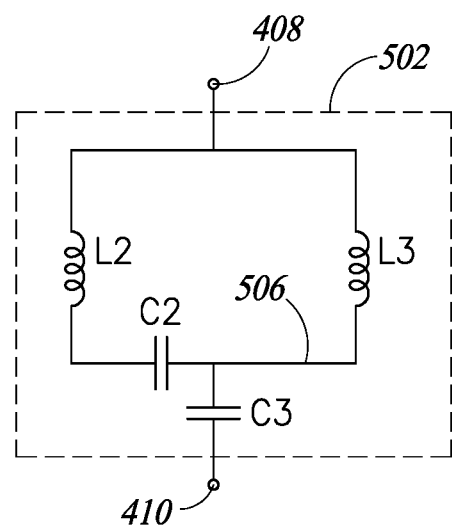
FIG. 5B is a schematic diagram of a passive resonant circuit of an illumination system, according to at least one illustrated embodiment.
Figure 5C:
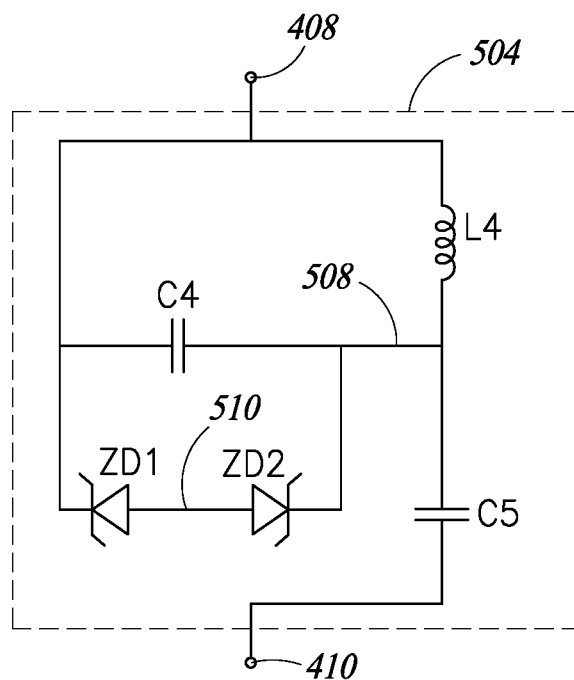
FIG. 5C is a schematic diagram of a passive resonant circuit of an illumination system, according to at least one illustrated embodiment.

FIG. 5A shows a schematic diagram of an implementation of a passive resonating circuit 500. The passive resonating circuit 500 may include an inductor L1 electrically coupled or directly connected to the node 408 (FIG. 4). The passive resonating circuit 500 may also include a capacitor C1 electrically coupled or directly connected between the node 410 (FIG. 4) and the inductor L1.

The values of the passive components of the passive resonating circuit 500 may be selected or set to cause the passive resonating circuit to resonate at the first frequency of the rectified output signal. In other words, the values of the inductor L1 and the capacitor C1 may be selected or set to have a resonant frequency that is approximately twice the frequency of the AC power signal from the AC power source 118. Typically, an LC circuit resonates at a frequency in which the impedance of the inductor ($Z_L = j\omega L$) summed with the impedance of the capacitor ($Z_C = 1/(j\omega C)$) is equal to zero.

The resonant frequency f of an LC circuit may be determined mathematically as follows:

$$f = \frac{1}{(2\pi\sqrt{L1 * C1})}.$$

According to one implementation, the inductor L1 has an inductance of 88 millihenries and the capacitor C1 has an inductance of 20 microfarads, so that the resonant frequency f is 120 hertz. The inductor L1 may be a ferrite core or laminated iron core inductor with a single winding, for example. The inductor L1 may also be constructed with two windings on a single shared core. The capacitor C1 may be an electrolytic, ceramic, tantalum, polypropylene film, or polyester metal film capacitor. Other values may be chosen for the inductor L1 and the capacitor C1 to achieve the desired frequency. Furthermore, the values of inductor L1 and capacitor C1 may be selected or set to produce resonant frequencies that are higher than, or lower than, or twice the frequency of the AC power signal from the AC power source 118. For example, in Europe where the AC power source 118 generates the AC power signal at 50 hertz, and the AC conditioning circuit 222 generates a rectified output signal at 100 hertz, a capacitor C1 with a 27 microfarad capacitance may be used to cause the passive resonating circuit 500 to have a resonating frequency f of approximately 103 hertz.

The passive resonating circuit 500 may multiply the frequency of the rectified output signal at the node 408 (FIG. 4) from the first frequency to a second frequency. In the absence of the passive resonating circuit 500, the rectified output signal may have a first frequency of 120 hertz at the node 408. The addition of the passive resonating circuit 500 that is excited by the 120 hertz rectified output signal may multiply the frequency of the rectified output signal at the node 408 from a first frequency of 120 hertz to a second frequency of 240 hertz. In countries supplying a 50 hertz AC power signal, the passive resonating circuit 500 may multiply the frequency of the rectified output signal at the node 408 from a first frequency of 100 hertz to, for example, a second frequency of 200 hertz. Thus, the passive resonating circuit 500 multiplies the frequency of the rectified output signal from a first frequency that is, for example, twice as high as the frequency of the AC power signal to a second frequency that is, for example, at least four-times as high as the frequency of the AC power signal. Accordingly, the illumination system 400 may receive an AC power signal having a frequency that is greater than 30 hertz and may multiply the frequency of that signal to exceed the 120 hertz threshold at which flicker has been determined to no longer be physiologically or visually perceived by humans.

FIG. 5B shows a schematic diagram for another implementation of a passive resonating circuit 502. The passive resonating circuit 502 may be electrically coupled to the AC conditioning circuit 222 to receive the rectified output signal at the node 408 (FIG. 4). The passive resonating circuit 502 may include an inductor L2 electrically coupled or directly connected to the node 408 and a capacitor C2 electrically coupled or directly connected between a node 506 and the inductor L2. An inductor L3 may also be electrically coupled or directly connected between the node 408 and the node 506. A capacitor C3 may be electrically coupled or connected to the capacitor C2 and the inductor L3 at the node 506. The capacitor C3 may also be connected to the node 410.

The passive resonating circuit 502 may be configured to resonate at the first frequency of the rectified output signal. In other words, the values of the inductors L2 and L3 and the capacitors C2 and C3 may be selected or set so as to produce a resonant frequency that is, for example, approximately twice the frequency of the AC power signal from the AC power source 118.

According to one implementation, the inductance of the inductor L2 is 10 millihenries, the inductance of the inductor L3 is 10 millihenries, the capacitance of the capacitor C2 is 20 microfarads, and the capacitance of the capacitor C3 is 100 microfarads, so that the passive resonating circuit 502 at least partially resonates at a frequency of approximately 120 hertz. Each of the inductors L2, L3 may be implemented with a single-winding inductor or with a multiple-winding inductor. The capacitor C2 may be a polyester film capacitor. The capacitor C3 may be an electrolytic capacitor. Inductors L2, L3 and/or capacitors C2, C3 with other values may be selected or chosen to excite the passive resonating circuit 502 at a desired frequency. Furthermore, the values of the inductors L2, L3 and the capacitors C2, C3 may be selected or set to cause the passive resonating circuit 502 to resonate at frequencies that are higher, or lower, than the first frequency of the signal output, so as to decrease the magnitude of the response of the passive resonating circuit 502 to the first frequency of the rectified output signal.

The passive resonating circuit 502 may multiply the frequency of the rectified output signal at the node 408 from the first frequency to the second frequency. Exciting the passive resonating circuit 502 with a 100-120 Hertz rectified output signal may result in multiplication of the frequency of the rectified output signal at the node 408 from a first frequency of 100-120 hertz to a second frequency of 200-240 hertz. Accordingly, the passive resonating circuit 502 multiplies the frequency of the rectified output signal from a first frequency that is, for example, twice as high as the frequency of the AC power signal (50-60 hertz) to a second frequency that is, for example, at least four-times as high as the frequency of the AC power signal.

The passive resonating circuit 502 may be implemented with smaller and less-expensive components than the passive resonating circuit 500. The passive resonating circuit 502 may use lower-inductance inductors L2, L3 in place of a single higher-inductance inductor L1 to multiply the frequency of the rectified output signal. The lower-inductance inductors L2, L3 may have a lower resistance than a single larger inductor, the employment thereof may therefore result in lower losses due to power dissipation in the passive resonating circuit 502. The inductors L2, L3 of the passive resonating circuit 502 may be both dimensionally smaller and lighter weight than the inductor L1 of the passive resonating circuit 500. Because the passive resonating circuit 500 or 502 is part of an illumination system and may be fitted into a housing, both weight and size of the components of the passive resonating circuit 500 or 502 influence the marketability of the illumination system 400. Additionally, two lower-inductance inductors L2, L3 may be less costly than that of a single higher-inductance inductor L1. The illumination system 400 may be implement with passive components having tolerances of up to 20% and still operate as desired.

FIG. 5C shows a schematic diagram for another implementation of a passive resonating circuit 504. The passive resonating circuit 504 may be electrically coupled to the AC conditioning circuit 222 to receive the rectified output signal at the node 408 (FIG. 4). The passive resonating circuit 504 may include an inductor L4 electrically coupled or directly connected between the node 408 and a node 508. The passive resonating circuit 504 may also include a capacitor C4 electrically coupled or directly connected between the node 408 and the node 508. A pair of zener diodes ZD1, ZD2 may be electrically coupled in parallel to the capacitor C4, such that a cathode terminal of the first zener diode ZD1 is connected to the node 408, a cathode terminal of the second zener diode ZD2 is connected to the node 508, and anode terminals of the pair of zener diodes ZD1, ZD2 are connected together at a node 510. A capacitor C5 may also be electrically coupled or connected to the capacitor C4, the inductor L4, and the cathode terminal of the second zener diode ZD2 at the node 508. The capacitor C5 may also be connected to node 410 (FIG. 4) or a voltage reference, such as ground or a voltage bias.

The passive resonating circuit 504 may be configured to resonate at the first frequency of the rectified output signal. In other words, the inductor L4 and the capacitors C4 and C5 may be selected with values that cause the passive resonating circuit 504 to have a resonant frequency that is, for example, approximately twice the frequency of the AC power signal (50-60 hertz) from the AC power source 118.

For instance, the inductance of the inductor L4 is 10 millihenries, the capacitance of the capacitor C4 is 40 microfarads, the capacitance of the capacitor C5 is 200 microfarads, and the breakdown or reverse voltage of the zener diodes ZD1, ZD2 is 33 volts so that the passive resonating circuit 504 resonates at a frequency of approximately 120 hertz. The inductor L4 may be toroidal and may have multiple windings. The capacitor C4 may be a polyester film capacitor. The capacitor C5 may be an electrolytic capacitor. The inductor L4 and the capacitors C4, C5 may be selected with other inductance and capacitance values to excite the passive resonating circuit 504 at other frequencies.

The passive resonating circuit 504 may multiply the frequency of the rectified output signal at the node 408 from the first frequency to the second frequency. The passive resonating circuit 504 that is excited by a 100-120 hertz rectified output signal may multiply the frequency of the rectified output signal at the node 408 from a first frequency of, for example, 100-120 hertz to a second frequency of, for example, 200-240 hertz, or higher. Accordingly, the passive resonating circuit 504 multiplies the frequency of the rectified output signal from a first frequency that is, for example, twice as high as the frequency of the AC power signal (50-60 hertz) to a second frequency that is, for example, at least four-times as high as the frequency of the AC power signal.

Advantageously, the passive resonating circuit 504 may be implemented with smaller and less-expensive components than the previously illustrated passive resonating circuits 500 and 502. The passive resonating circuit 504 may use a single inductor L4 that is significantly smaller than the inductor L1 of the passive resonating circuit 500 and that is one less component than the two inductors L2, L3 of the passive resonating circuit 502. Thus, the use of the single inductor L1 results in a lower resistance and lower power dissipation in the passive resonator circuit 504 than may be exhibited by passive resonator circuits 500 and 502. Additionally, two zener diodes ZD1, ZD2 may be significantly lighter and less expensive than a single larger inductance (e.g., 10 millihenries) inductor, so the passive resonating circuit 504 may be lighter and less costly to manufacture than the passive resonating circuit 502.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers), as one or more programs running on one or more processors (e.g., microprocessors), as firmware, or as virtually any combination thereof, and that designing the circuitry and/or writing the code for the software and/or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various embodiments described above can be combined to provide further embodiments. To the extent that they are not inconsistent with the specific teachings and definitions herein, all of the U.S. patents, U.S. patent application publications, and U.S. patent applications referred to in this specification and/or listed in the Application Data Sheet, including but not limited to U.S. Provisional Patent Application No. 61/052,924, filed May 13, 2008; U.S. Patent Publication No. US 2009/0284155, published Nov. 19, 2009; U.S. Provisional Patent Application No. 61/051,619, filed May 8, 2008; U.S. Pat. No. 8,118,456, issued Feb. 12, 2012; U.S. Provisional Patent Application No. 61/088,651, filed Aug. 13, 2008; U.S. Patent Publication No. US 2010/0090577, published Apr. 15, 2010; U.S. Provisional Patent Application No. 61/115,438, filed Nov. 17, 2008; U.S. Provisional Patent Application No. 61/154,619, filed Feb. 23, 2009; U.S. Patent Publication No. US2010/0123403, published May 20, 2010; U.S. Provisional Patent Application No. 61/174,913, filed May 1, 2009; U.S. Patent Publication No. US2010/0277082, published Nov. 4, 2010; U.S. Provisional Patent Application No. 61/180,017, filed May 20, 2009; U.S. Patent Publication No. US2010/0295946, published Nov. 25, 2010; U.S. Provisional Patent Application No. 61/229,435, filed Jul. 29, 2009; U.S. Patent Publication No. US2011/0026264, published Feb. 3, 2011; U.S. Provisional Patent Application No. 61/295,519, filed Jan. 15, 2010; U.S. Provisional Patent Application No. 61/406,490, filed Oct. 25, 2010; U.S. Patent Publication No. US2011/0175518, published Jul. 21, 2011; U.S. Provisional Patent Application Ser. No. 61/333,983, filed May 12, 2010; U.S. Patent Publication No. US2010/0295454, published Nov. 25, 2010; U.S. Provisional Patent Application Ser. No. 61/346,263, filed May 19, 2010; U.S. Patent Publication No. US2010/0295455, published Nov. 25, 2010; U.S. Provisional Patent Application Ser. No. 61/357,421, filed Jun. 22, 2010; U.S. Patent Publication No. US2011/0310605, published Dec. 22, 2011; U.S. Patent Publication No. 2012/0262069, published Oct. 18, 2012; U.S. Non-Provisional patent application Ser. No. 13/212,074, filed Aug. 17, 2011; U.S. Provisional Patent Application Ser. No. 61/527,029, filed Aug. 24, 2011; U.S. Non-Provisional patent application Ser. No. 13/592,590, filed Aug. 23, 2012; U.S. Provisional Patent Application Ser. No. 61/534,722, filed Sep. 14, 2011; U.S. Non-Provisional patent application Ser. No. 13/619,085, filed Sep. 14, 2012; U.S. Provisional Patent Application Ser. No. 61/567,308, filed Dec. 6, 2011; U.S. Provisional Patent Application Ser. No. 61/561,616, filed Nov. 18, 2011; U.S. Provisional Patent Application Ser. No. 61/641,781, filed May 2, 2012; U.S. Non-Provisional patent application Ser. No. 13/411,321, filed Mar. 2, 2012; U.S. Provisional Patent Application Ser. No. 61/640,963, filed May 1, 2012; U.S. Provisional Patent Application No. 61/764,395, filed Feb. 13, 2013; U.S. Non-Provisional patent application Ser. No. 13/558,191, filed Jul. 25, 2012; U.S. Provisional Patent Application Ser. No. 61/692,619, filed Aug. 23, 2012; U.S. Provisional Patent Application Ser. No. 61/694,159, filed Aug. 28, 2012; U.S. Non-Provisional patent application Ser. No. 13/604,327, filed Sep. 5, 2012; U.S. Provisional Patent Application Ser. No. 61/723,675, filed Nov. 7, 2012; U.S. Non-Provisional patent application Ser. No. 13/679,687, filed Nov. 16, 2012; U.S. Provisional Patent Application Ser. No. 61/728,150, filed Nov. 19, 2012; U.S. Provisional Patent Application Ser. No. 61/764,395, filed Feb. 13, 2013; Provisional patent application Ser. No. 13/786,114, filed Mar. 5, 2013; U.S. Non-Provisional patent application Ser. No. 13/786,332, filed Mar. 5, 2013; U.S. Non-Provisional patent application Ser. No. 13/875,000, filed May 1, 2013; U.S. Provisional Patent Application No. 61/849,841, filed Jul. 24, 2013; U.S. Provisional patent application Ser. No. 13/973,696, filed Aug. 22, 2013; U.S. Provisional Patent Application No. 61/878,425, filed Sep. 16, 2013; U.S. Non-Provisional patent application Ser. No. 14/074,166, filed Nov. 7, 2013; U.S. Provisional Patent Application No. 61/905,699, filed Nov. 18, 2013; U.S. Provisional Patent Application No. 61/933,733, filed Jan. 30, 2014; U.S. Provisional Patent Application No. 62/057,419, filed Sep. 30, 2014, U.S. Provisional Patent Application No. 61/905,699, filed Nov. 18, 2013, U.S. Provisional Patent Application No. 62/068,517, filed Oct. 24, 2014 and U.S. Non-Provisional patent application Ser. No. 14/546,354, filed Nov. 18, 2014; are incorporated herein by reference in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An illumination system, comprising:
one or more magnetic cores;
one or more control windings, each of the one or more control windings wound around at least a portion of at least one of the one or more magnetic cores;
a control circuit electrically coupled to the one or more control windings, the control circuit controls a flow of direct current through the one or more control windings which causes a biasing magnetic flux in the one or more magnetic cores;
one or more power windings, each of the one or more power windings wound around at least a portion of at least one of the one or more magnetic cores, the one or more power windings directly electrically coupled to a first terminal of an alternating current supply;
a rectifier directly electrically coupled to the one or more power windings; and
a plurality of solid-state light sources directly electrically coupled to a second terminal of the alternating current supply and electrically coupled to the rectifier, wherein in operation the rectifier provides a direct current to drive the plurality of solid-state light sources.

2. The illumination system of claim 1 wherein the plurality of solid-state light sources are light emitting diodes (LEDs).

3. The illumination system of claim 1 wherein the alternating current supply operates at approximately 50 or 60 Hertz.

4. The illumination system of claim 1, further comprising:
a feedback circuit that communicatively couples a feedback current to the control circuit which controls a flow of direct current through the plurality of solid-state light sources to a defined instantaneous level.

5. The illumination system of claim 4 wherein the feedback circuit is electrically isolated from the plurality of solid-state light sources.

6. The illumination system of claim 4 wherein the control circuit implements a power factor correction transfer function which controls the flow of direct current through the one or more control windings which controls the flow of alternating current through the one or more power windings in a manner which improves the power factor of the illumination system.

7. The illumination system of claim 6 wherein the control circuit receives a measure of at least one of an input voltage or a phase angle of the alternating current supply.

8. The illumination system of claim 6 wherein the control circuit includes at least one microcontroller that implements the power factor correction transfer function.

9. The illumination system of claim 8 wherein the control circuit includes at least one nontransitory processor-readable storage medium that stores the power factor correction transfer function, and which is communicatively coupled to the microcontroller, and wherein the microcontroller receives a measure of at least one of an input voltage or a phase angle of the alternating current supply, and uses the measure to index into a table of direct current control output values and retrieve a direct current control output value that corrects the power factor of the power delivered to the plurality of solid-state light sources.

10. The illumination system of claim 1, further comprising:
a power factor correction capacitor electrically coupled across terminals of the alternating current supply.

11. The illumination system of claim 1 wherein the one or more power windings do not electrically galvanically isolate the plurality of solid-state light sources from the alternating current supply.

12. The illumination system of claim 1 wherein the one or more power windings electrically galvanically isolate the plurality of solid-state light sources from the alternating current supply.

13. The illumination system of claim 1 wherein more than one set of power windings drive a plurality of separated solid-state light sources controlled by one or more common or separate control windings.

14. The illumination system of claim 1, further comprising:
a flicker control circuit comprising a passive resonating circuit electrically coupled to the rectifier to increase a frequency of an output signal of the rectifier to a frequency that is sufficiently high that a flicker from the plurality of solid-state light sources is undetectable by an unaided human eye.

15. The illumination system of claim 1 wherein the rectifier comprises at least two solid-state rectifiers.

16. The illumination system of claim 1 wherein the rectifier comprises at least four solid-state rectifiers.

17. The illumination system of claim 1 wherein the one or more magnetic cores comprises a magnet core having a plurality of legs, the one or more control windings wound around a first leg, the one or more power windings wound around a second leg different from the first leg.

18. The illumination system of claim 1 wherein the one or more magnetic cores comprises at least two magnetic cores, the one or more control windings are wound around at least a portion of each of the at least two magnetic cores, and the one or more power windings are wound around at least a portion of each of the at least two magnetic cores.

19. A drive circuit to drive a plurality of solid-state light sources of an illumination system, the drive circuit comprising:
a magnetic core;
a control windings wound around at least a portion of the magnetic core;
a control circuit electrically coupled to the control winding, the control circuit controls a flow of direct current through the control winding which causes a biasing magnetic flux in the magnetic core;
a power winding wound around at least a portion of the magnetic core, the power winding directly electrically coupled to a first terminal of an alternating current supply; and
a rectifier directly electrically coupled to the power winding and electrically coupled to the plurality of solid-state light sources, in operation the power winding receives alternating current from the alternating current supply directly electrically coupled to the power winding and causes the alternating current supply to deliver direct current to the plurality of solid-state light sources via the rectifier.

\* \* \* \* \*